US009113348B2

(12) United States Patent  
Awoniyi et al.

(10) Patent No.: US 9,113,348 B2  
(45) Date of Patent: Aug. 18, 2015

(54) COMPRESSED MODE MEASUREMENTS FOR FLEXIBLE BANDWIDTH CARRIER SYSTEMS, DEVICES, AND METHODS

(71) Applicant: QUALCOMM Incorporated, San Diego, CA (US)

(72) Inventors: Olufunmilola O. Awoniyi, San Diego, CA (US); Samir Salib Soliman, San Diego, CA (US); Edwin C. Park, San Diego, CA (US); Roy Franklin Quick, Jr., San Diego, CA (US); Soumya Das, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 13/707,465

(22) Filed: Dec. 6, 2012

(65) Prior Publication Data

US 2013/0148527 A1 Jun. 13, 2013

Related U.S. Application Data

(60) Provisional application No. 61/568,742, filed on Dec. 9, 2011, provisional application No. 61/672,182, filed on Jul. 16, 2012.

(51) Int. Cl.
*H04W 24/00* (2009.01)
*H04W 24/02* (2009.01)
(Continued)

(52) U.S. Cl.
CPC .......... *H04W 24/02* (2013.01); *H04W 36/0094* (2013.01); *H04W 48/20* (2013.01)

(58) Field of Classification Search
CPC ... H04W 36/00; H04W 36/18; H04B 17/0042
See application file for complete search history.

(56) References Cited

U.S. PATENT DOCUMENTS

2007/0060095 A1* 3/2007 Subrahmanya et al. ... 455/343.1

2007/0254598 A1* 11/2007 Bachl et al. ..................... 455/73
(Continued)

FOREIGN PATENT DOCUMENTS

EP 2317792 A1 5/2011
EP 2385723 A1 11/2011

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, 3rd Generation Partnership Project (3GPP), Mobile Competence Centre ; 650, Route Des Lucioles ; F-06921 Sophiaantipolis Cedex ; France, vol. RAN WG2, No. V10.4.0, Jun. 22, 2011, pp. 1-194, XP050553479.
(Continued)

*Primary Examiner* — John Blanton
(74) *Attorney, Agent, or Firm* — Jeffrey D. Jacobs

(57) ABSTRACT

Methods, systems, and devices are provided that may address problems to enabling a user equipment (UE) in connected mode on a normal bandwidth cell to make inter-frequency measurements on another normal bandwidth cell and a flexible bandwidth cell. Some embodiment utilize a set of compressed mode gap configurations for measuring both normal bandwidth and flexible bandwidth inter-frequency cells with the following modification for flexible bandwidth cells: reducing the coherent length used by the UE; using the same cell search parameters at the UE but modifying the compressed mode gap parameters to accommodate both normal bandwidth and flexible bandwidth cell search; and/or maintaining the compressed mode gap parameters but reducing the search window size during cell search coherent accumulation. Some embodiments may configure separate compressed mode measurements configuration for normal bandwidth and flexible bandwidth measurements.

61 Claims, 24 Drawing Sheets

(51) Int. Cl.
*H04W 36/00* (2009.01)
*H04W 48/20* (2009.01)

(56) References Cited

U.S. PATENT DOCUMENTS

| | | | |
|---|---|---|---|
| 2009/0042532 A1 | 2/2009 | Bienas et al. | |
| 2010/0222060 A1 | 9/2010 | Zhang et al. | |
| 2011/0274007 A1* | 11/2011 | Lin et al. | 370/254 |
| 2012/0094651 A1 | 4/2012 | Chun et al. | |
| 2012/0147772 A1 | 6/2012 | Kazmi et al. | |
| 2012/0231782 A1 | 9/2012 | Hellander et al. | |
| 2013/0109372 A1* | 5/2013 | Ekici | 455/422.1 |
| 2013/0114415 A1 | 5/2013 | Das et al. | |
| 2013/0114433 A1 | 5/2013 | Park et al. | |
| 2013/0114436 A1 | 5/2013 | Dural et al. | |
| 2013/0114473 A1 | 5/2013 | Awoniyi et al. | |
| 2013/0114566 A1 | 5/2013 | Awoniyi et al. | |
| 2013/0114571 A1 | 5/2013 | Das et al. | |
| 2013/0115967 A1 | 5/2013 | Soliman et al. | |
| 2013/0115991 A1 | 5/2013 | Awoniyi et al. | |
| 2013/0115994 A1 | 5/2013 | Awoniyi et al. | |
| 2013/0121265 A1 | 5/2013 | Awoniyi et al. | |
| 2013/0148520 A1 | 6/2013 | Das et al. | |
| 2013/0148576 A1 | 6/2013 | Huang et al. | |
| 2013/0148579 A1 | 6/2013 | Das et al. | |
| 2013/0148627 A1 | 6/2013 | Das et al. | |
| 2013/0148628 A1 | 6/2013 | Das et al. | |
| 2013/0148629 A1 | 6/2013 | Das et al. | |
| 2013/0150045 A1 | 6/2013 | Das et al. | |
| 2013/0182655 A1 | 7/2013 | Das et al. | |

OTHER PUBLICATIONS

International Search Report and Written Opinion—PCT/US2012/068552—ISA/EPO—Mar. 8, 2013.
Nokia Siemens Networks (Rapporteur): "Measurements for Carrier Aggregation", 3GPP Draft; 36300_CR0313-(REL-10)_R2-111540 on CA Measurements, 3rd Generation Partnership Project (3GPP), Mobile Competence Centre; 650, Route Des Lucioles; F-06921 Sophia-Antipolis Cedex ; France, vol. RAN WG2, No. Taipei, Taiwan; 20110221, Feb. 23, 2011, XP050493859.
Wang Y.P.E., et al., "Cell Search in W-CDMA", IEEE Journal on Selected Areas in Communications, IEEE Service Center, Piscataway, US, vol. 18, No. 8, Aug. 1, 2000, XP011055194, pp. 1470-1482, ISSN: 0733-8716.
3GPP TS 25.133; 3rd Generation Partnership Project; Requirements for Support of Radio Resource Management (FDD); Protocol Specification, 4 pages. <URL: http://www.3gpp.org/ftp/Specs/html-info/25133.htm>.
3GPP TS 25.215; 3rd Generation Partnership Project; Physical Layer; Measurements (FDD), 2 pages. <URL: http://www.3gpp.org/ftp/Specs/html-info/25215.htm>.
3GPP TS 25.331; 3rd Generation Partnership Project; Radio Resource Control (RRC); Protocol Specification, 5 pages. <URL: http://www.3gpp.org/ftp/Specs/html-info/25331.htm>.
Co-pending U.S. Appl. No. 13/707,111, filed Dec. 6, 2012.

* cited by examiner

| Info. Element/Group Name | Type And Reference | Semantics Description |
|---|---|---|
| Transmission Gap Pattern Sequence | | |
| > TGPSI | TGPSI 10.3.6.82 | |
| > TGPS Status Flag | Enumerated (activate, deactivate) | This flag indicates whether the Transmission Gap Pattern Sequence (TGPS) shall be activated or deactivated |
| > TGCFN | Integer (0..255) | Connection Frame Number of the first frame of the first pattern within the TGPS |
| > Transmission gap pattern sequence configuration parameters | | |
| >> TGMP | Enumerated (TDD measurement, FDD measurement, GSM carrier RSSI measurement, GSM Initial BSIC identification, GSM BSIC re-confirmation Multi-carrier measurement) | TGPS Measurement Purpose |
| >> TGPRC | Integer (1..511, Infinity) | The number of transmission gap patterns within the TGPS |
| >> TGSN | Integer (0..14) | Transmission Gap Starting Slot Number The slot number of the first transmission gap slot within the TGCFN |
| >> TGL1 | Integer (1..14) | The length of the first Transmission Gap within the transmission gap pattern expressed in number of slots |
| >> TGL2 | Integer (1..14) | The length of the second Transmission Gap within the transmission gap pattern. If omitted, then TGL2=TGL1. |
| >> TGD | Integer (15..269, undefined) | Transmission gap distance indicates the number of slots between starting slots of two consecutive transmission gaps within a transmission gap pattern. If there is only one transmission gap in the transmission gap pattern, this term shall be set to undefined. |
| >> TGPL1 | Integer (1..144) | The duration of transmission gap pattern 1. |

FIG. 6

| Scenarios | Max. Cell Power (Ior) | Tx Power CPICH (Ec) | Tx Power P-SCH (Ec) | Coh. Len. |
|---|---|---|---|---|
| 1. N = 1 Configuration | 43 dBm (assuming N = 1) | 33 dBm, Ec/Ior = -10 dB | 28 dBm, Ec/Ior = -15 dB | W |
| 2. Baseline for F-UMTS (Same PSD as UMTS) | 40 dBm (assuming N = 2) | 30 dBm, Ec/Ior = -10 dB | 25 dBm, Ec/Ior = -15 dB | W |
| 3. F-UMTS with less Coh. Len. and higher PSD | 43 dBm (assuming N = 2) | 33 dBm, Ec/Ior = -10 dB | 28 dBm, Ec/Ior = -15 dB | W/N |
| 4. F-UMTS with same PSD, higher control channel power | 40 dBm (assuming N = 2) | 33 dBm, Ec/Ior = -7 dB | 28 dBm, Ec/Ior = -12 dB | W/N |
| 5. F-UMTS with increased PSD by increasing power on control channels only | 40+x dBm (assuming N = 2) | 33 dBm, Ec/Ior = -7 dB | 28 dBm, Ec/Ior = -12 dB | W/N |

FIG. 7

COMPRESSED MODE MEASUREMENTS FOR FLEXIBLE BANDWIDTH CARRIER SYSTEMS, DEVICES, AND METHODS

CROSS REFERENCES

The present application for patent claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein for all purposes. The present application for patent also claims priority to Provisional Patent Application Ser. No. 61/672,182, entitled "COMPRESSED MODE MEASUREMENTS FOR FLEXIBLE BANDWIDTH SYSTEMS, DEVICES, AND METHODS" filed on Jul. 16, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiples of channel bandwidths, hence there may be unutilized parts of the spectrum. As the use of wireless devices has increased, the demand for and value of this spectrum has generally increased, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 megahertz (MHz)). This may provide a partial solution to the problem. Flexible bandwidth carrier systems may provide another solution to these problems. However, different issues may arise when making inter-frequency measurements with respect to flexible bandwidth carrier systems.

SUMMARY

Methods, systems, and devices are provided that may address problems pertaining to how a normal bandwidth radio access network may enable a user equipment (UE) in connected mode on a normal bandwidth cell to make inter-frequency measurements on another normal bandwidth cell and one or more flexible bandwidth cells, or on multiple flexible bandwidth inter-frequency cells. Some embodiments utilize a set of compressed mode gap configurations for measuring both normal bandwidth and flexible bandwidth inter-frequency cells with reducing the coherent length and/or the non-coherent length used by the UE for inter-frequency flexible bandwidth cell search during the search procedures (for example, with respect to the primary and secondary synchronization channels—P-SCH, S-SCH—and the pilot channel—CPICH). Some embodiments include increasing the power on the one or more control channels in some cases (such as P-SCH, S-SCH, and/or CPICH) to accommodate the loss due to the coherent length reduction and/or the non-coherent length reduction. Some embodiments include using the same cell search parameters as used for the normal bandwidth measurements at the UE but modifying the compressed mode gap parameters to accommodate both normal bandwidth and flexible bandwidth cell search (for example increasing the compressed mode gap length). Another embodiment may include maintaining the compressed mode gap parameters for normal bandwidth measurements but reducing the search window size during cell search's coherent accumulation. In some embodiments, the UE maps compressed gap configurations for normal cells to compressed gap configurations optimized for flexible bandwidth cells and stored in the UE. Some embodiments include any combination of the above embodiments. Some embodiments utilize normal bandwidth carrier system such as a Universal Mobile Telecommunication System (UMTS) and/or flexible bandwidth carrier systems such as a flexible UMTS (F-UMTS).

Some embodiments may configure separate compressed mode measurements configuration for different bandwidth measurements, such as normal bandwidth and flexible bandwidth measurements or such as multiple different flexible bandwidth measurements by: signaling normal bandwidth configuration first and flexible bandwidth configuration second and activating both simultaneously at the UE; signaling configuration for the flexible bandwidth using an invalid Transmission Gap Pattern Sequence Identifier (TGPSI); and/or signaling one setting for normal bandwidth cells and after the normal bandwidth measurements are completed, deactivating the configuration for the normal bandwidth and configuring the next for flexible bandwidth.

Flexible bandwidth carrier systems may involve wireless communications systems that may utilize portions of spectrum that may not be big enough to fit a normal waveform utilizing flexible waveforms. A flexible bandwidth carrier system may be generated with respect to a normal carrier bandwidth system through dilating the time (e.g., frame duration), or scaling down the chip rate of the flexible bandwidth carrier system with respect to the normal carrier bandwidth system. Some embodiments increase the bandwidth of a flexible waveform through expanding, or scaling up the chip rate or reducing the time (e.g., frame duration) of the flexible carrier bandwidth system.

In some embodiments, a method for inter-frequency measurements of flexible bandwidth carrier systems includes identifying, at a user equipment, one or more parameters configured to facilitate the inter-frequency measurements with respect to two or more different bandwidth carriers, wherein at least one of the bandwidth carriers is a flexible bandwidth carrier; and utilizing the one or more identified parameters to perform one or more inter-frequency measurements with respect to the two or more different bandwidth carriers. Identifying the one or more parameters may include reducing one or more cell search coherent accumulation lengths to facilitate the inter-frequency measurements with respect to the two or more different bandwidth carriers. Identifying the one or more parameters may include reducing one or more non-coherent accumulation lengths to facilitate the inter-frequency measurements with respect to the two or more different bandwidth carriers. Identifying the one or more parameters may include receiving an increased amount of repetition of a transmission gap pattern to facilitate the inter-frequency measurements with respect to the two or more different bandwidth carriers. Identifying the one or more parameters may include receiving an increased length of a transmission gap to facilitate the inter-frequency measurements with respect to the two or more different bandwidth carriers. Identifying the one or more parameters may include reducing a window size to facilitate the inter-frequency measurements with respect to the two or more different bandwidth carriers.

In some embodiments, identifying the one or more parameters further includes at least creating, at the UE, one or more compressed gap configurations for a flexible bandwidth carrier system corresponding to one or more compressed gap configurations for a normal bandwidth carrier system. Identifying the one or more parameters may further include at least storing, at the UE, one or more compressed gap configurations for a flexible bandwidth carrier system corresponding to one or more compressed gap configurations for a normal bandwidth carrier system. Identifying the one or more parameters may further include at least mapping and storing, at the UE, one or more compressed gap configurations transmitted by a base station for searching normal cells to one or more other compressed gap configurations for one or more flexible bandwidth cells.

In some embodiments, the one or more parameters include at least one or more compressed mode parameters, timing information, or search parameters. The at least one of the bandwidth carriers may be a normal bandwidth carrier. The at least one of the bandwidth carriers may include a flexible bandwidth carrier in a serving cell with a higher bandwidth than a flexible bandwidth carrier in a neighboring cell. Moreover, the inter-frequency measurements may be performed in a connected mode.

In some embodiments, utilizing the one or more identified parameters includes utilizing separate parameters of the one or more identified parameters to facilitate the inter-frequency measurements with respect to the two or more different bandwidth carriers. The separate parameters may be configured to be utilized at a same time or at separate times. Utilizing the one or more identified parameters may include utilizing an invalid transmission gap pattern identifier to facilitate the inter-frequency measurements with respect to the two or more different bandwidth carriers and/or utilizing the invalid transmission gap pattern identifier to identify legacy user equipment.

In some embodiments, utilizing the one or more identified parameters includes utilizing the same one or more parameters of the one or more identified parameters to facilitate the inter-frequency measurements with respect to the two or more different bandwidth carriers.

In some embodiments, identifying the one or more parameters includes receiving the one or more parameters, wherein the one or more parameters are transmitted from a base station. Identifying the one or more parameters may include determining the one or more parameters, wherein the one or more parameters are stored on a storage medium of the user equipment.

In some embodiments, utilizing the one or more parameters includes utilizing the same one or more parameters of the one or more identified parameters to facilitate the inter-frequency measurements with respect to a normal bandwidth carrier and with respect to the at least one of the bandwidth carriers that is a flexible bandwidth carrier.

In some embodiments, a time source is run at a dilated time when performing the inter-frequency measurements with respect to at least one of the two or more different bandwidth carriers.

In some embodiments, a wireless communications system includes means for identifying one or more parameters configured to facilitate inter-frequency measurements with respect to two or more different bandwidth carriers, wherein at least one of the bandwidth carriers is a flexible bandwidth carrier; and means for utilizing the one or more identified parameters to perform one or more inter-frequency measurements with respect to the two or more different bandwidth carriers. The means for identifying the one or more parameters may include at least one of: means for reducing one or more cell search coherent accumulation lengths to facilitate the inter-frequency measurements with respect to the two or more different bandwidth carriers; means for reducing one or more cell search non-coherent accumulation lengths to facilitate the inter frequency measurements with respect to the two or more different bandwidth carriers; means for increasing, or received an increased, amount of repetition of a transmission gap pattern to facilitate the inter-frequency measurements with respect to the two or more different bandwidth carriers; means for increasing, or receive an increased, length of a transmission gap to facilitate the inter-frequency measurements with respect to the two or more different bandwidth carriers; or means for reducing a window size to facilitate the inter-frequency measurements with respect to the two or more different bandwidth carriers.

In some embodiments, the means for utilizing the one or more identified parameters include means for utilizing separate parameters of the one or more identified parameters to facilitate the inter-frequency measurements with respect to the two or more different bandwidth carriers. The means for utilizing the one or more identified parameters may include means for utilizing the same one or more parameters of the one or more identified parameters to facilitate the inter-frequency measurements with respect to the two or more different bandwidth carriers.

In some embodiments, the means for identifying the one more parameters include at least one of means for receiving the one or more parameters when the one or more parameters are transmitted from a base station or means for determining the one or more parameters when the one or more parameters are stored on a storage medium of the wireless apparatus.

In some embodiments, wireless communications device includes at least one processor communicatively coupled with a memory, the memory including executable code that, when executed by the at least one processor, causes the at least one processor to: identify one or more parameters configured to facilitate inter-frequency measurements with respect to two or more different bandwidth carriers, wherein at least one of the bandwidth carriers is a flexible bandwidth carrier; and utilize the one or more identified parameters to perform one or more inter-frequency measurements with respect to the two or more different bandwidth carriers.

In some embodiments, the executable code causes the at least one processor to perform at least one of: reduce one or more cell search coherent accumulation lengths to facilitate the inter-frequency measurements with respect to the two or more different bandwidth carriers; reduce one or more non-coherent accumulation lengths to facilitate the inter frequency measurements with respect to the two or more different bandwidth carriers; increase, or receive an increased, amount of repetition of a transmission gap pattern to facilitate the inter-frequency measurements with respect to the two or more different bandwidth carriers; increase, or receive an increased, length of a transmission gap to facilitate the inter-frequency measurements with respect to the two or more different bandwidth carriers; or reduce a window size to facilitate the inter-frequency measurements with respect to the two or more different bandwidth carriers.

In some embodiments, the executable code causes the at least one processor to utilize separate parameters of the one or more identified parameters to facilitate the inter-frequency measurements with respect to the two or more different bandwidth carriers. The executable code may cause the at least one processor to utilize the same one or more parameters of the one or more identified parameters to facilitate the inter-frequency measurements with respect to the two or more different bandwidth carriers. The executable code may cause the at least one processor to perform at least one of receive the one or more parameters when the one or more parameters are transmitted from a base station or determine the one or more parameters when the one or more parameters are stored on a storage medium of the wireless communications device.

In some embodiments, computer program product for inter-frequency measurements of flexible bandwidth carrier systems includes a non-transitory computer-readable medium having code configured to identify, at a user equipment, one or more parameters configured to facilitate inter-frequency measurements with respect to two or more different bandwidth carriers, wherein at least one of the bandwidth carriers is a flexible bandwidth carrier; and code configured to utilize the one or more identified parameters to perform one or more inter-frequency measurements with respect to the two or more different bandwidth carriers.

In some embodiments, the non-transitory computer-readable medium further includes at least one of: code configured to reduce one or more cell search coherent accumulation lengths to facilitate the inter-frequency measurements with respect to the two or more different bandwidth carriers; code configured to reduce one or more non-coherent accumulation lengths to facilitate the inter frequency measurements with respect to the two or more different bandwidth carriers; code configured to increase, or receive an increased, amount of repetition of a transmission gap pattern to facilitate the inter-frequency measurements with respect to the two or more different bandwidth carriers; code configured to increase, or received an increased, length of a transmission gap to facilitate the inter-frequency measurements with respect to the two or more different bandwidth carriers; or code configured to reduce a window size to facilitate the inter-frequency measurements with respect to the two or more different bandwidth carriers.

In some embodiments, the non-transitory computer-readable medium further includes code configured to utilize separate parameters of the one or more identified parameters to facilitate the inter-frequency measurements with respect to the two or more different bandwidth carriers. The non-transitory computer-readable medium further includes code configured to utilize the same one or more parameters of the one or more identified parameters to facilitate the inter-frequency measurements with respect to the two or more different bandwidth carriers. The non-transitory computer-readable medium further includes at least one of code configured to receive the one or more parameters when the one or more parameters are transmitted from a base station or code configured to determine the one or more parameters when the one or more parameters are stored on a storage medium of the user equipment.

In some embodiments, a method for inter-frequency measurements of flexible bandwidth carrier systems includes identifying one or more parameters configured to facilitate the inter-frequency measurements with respect to two or more different bandwidth carriers, wherein at least one of the bandwidth carriers is a flexible bandwidth carrier; and transmitting the one or more identified parameters to one or more user equipment to facilitate the inter-frequency measurements with respect to the two or more different bandwidth carriers. The identifying the one or more parameters may include reducing one or more cell search coherent accumulation lengths to facilitate the inter-frequency measurements with respect to the two or more different bandwidth carriers. The identifying the one or more parameters may include reducing one or more cell search non-coherent accumulation lengths to facilitate the inter-frequency measurements with respect to the two or more different bandwidth carriers. The identifying the one or more parameters may include increasing an amount of repetition of a transmission gap pattern to facilitate the inter-frequency measurements with respect to the two or more different bandwidth carriers. The identifying the one or more parameters may include increasing a length of a transmission gap to facilitate inter-frequency measurements with respect to the two or more different bandwidth carriers. The identifying the one or more parameters may include reducing a window size to facilitate inter-frequency measurements with respect to the two or more different bandwidth carriers.

In some embodiments, the one or more identified parameters include at least one or more compressed mode parameters, timing information, or search parameters. The at least one of the bandwidth carriers may be a normal bandwidth carrier.

In some embodiments, separate parameters of the one or more identified parameters are configured to facilitate the inter-frequency measurements with respect to the two or more different bandwidth carriers. The same parameters of the one or more identified parameters may be configured to facilitate the inter-frequency measurements with respect to the two or more different bandwidth carriers.

In some embodiments, identifying the one more parameters includes determining the one or more parameters, wherein the one or more parameters are stored on a storage medium. The same parameters of the one or more identified parameters may be configured to facilitate the inter-frequency measurements with respect to a normal bandwidth carrier and with respect to the at least one of the bandwidth carriers that is a flexible bandwidth carrier.

In some embodiments, a wireless communications system includes means for identifying one or more parameters configured to facilitate inter-frequency measurements with respect to two or more different bandwidth carriers, wherein at least one of the bandwidth carriers is a flexible bandwidth carrier; and means for transmitting the one or more identified parameters to one or more user equipment to facilitate the inter-frequency measurements with respect to the two or more different bandwidth carriers.

In some embodiments, the means for identifying the one or more parameters include at least one of: means for reducing one or more cell search coherent accumulation lengths to facilitate the inter-frequency measurements with respect to the two or more different bandwidth carriers; means for reducing one or more cell search non-coherent accumulation lengths to facilitate the inter frequency measurements with respect to the two or more different bandwidth carriers; means for increasing an amount of repetition of a transmission gap pattern to facilitate the inter-frequency measurements with respect to the two or more different bandwidth carriers; means for increasing a length of a transmission gap to facilitate the inter-frequency measurements with respect to the two or more different bandwidth carriers; or means for reducing a window size to facilitate the inter-frequency measurements with respect to the two or more different bandwidth carriers.

In some embodiments, separate parameters of the one or more identified parameters are configured to facilitate the inter-frequency measurements with respect to the two or more different bandwidth carriers. The same parameters of the one or more identified parameters may be configured to facilitate the inter-frequency measurements with respect to the two or more different bandwidth carriers.

In some embodiments, a wireless communications device includes at least one processor communicatively coupled with a memory, the memory including executable code that, when executed by the at least one processor, causes the at least one processor to: identify one or more parameters configured to facilitate inter-frequency measurements with respect to two or more different bandwidth carriers, wherein at least one of the bandwidth carriers is a flexible bandwidth carrier; and transmit the one or more identified parameters to one or more user equipment to facilitate the inter-frequency measurements with respect to the two or more different bandwidth carriers.

In some embodiments, the executable code causes the at least one processor to perform at least one of: reduce one or more cell search coherent accumulation lengths to facilitate the inter-frequency measurements with respect to the two or more different bandwidth carriers; reduce one or more cell search non-coherent accumulation lengths to facilitate the inter frequency measurements with respect to the two or more different bandwidth carriers; increase an amount of repetition of a transmission gap pattern to facilitate the inter-frequency measurements with respect to the two or more different bandwidth carriers; increase a length of a transmission gap to facilitate the inter-frequency measurements with respect to the two or more different bandwidth carriers; or reduce a window size to facilitate the inter-frequency measurements with respect to the two or more different bandwidth carriers.

In some embodiments, separate parameters of the one or more identified parameters are configured to facilitate the inter-frequency measurements with respect to the two or more different bandwidth carriers. The same parameters of the one or more identified parameters may be configured to facilitate the inter-frequency measurements with respect to the two or more different bandwidth carriers.

In some embodiments, a computer program product for inter-frequency measurements of flexible bandwidth carrier systems includes a non-transitory computer-readable medium having: code configured to identify one or more parameters configured to facilitate the inter-frequency measurements with respect to two or more different bandwidth carriers, wherein at least one of the bandwidth carriers is a flexible bandwidth carrier; and code configured to transmit the one or more identified parameters to one or more user equipment to facilitate the inter-frequency measurements with respect to the two or more different bandwidth carriers.

In some embodiments, the non-transitory computer-readable medium includes at least one of: code configured to reduce one or more cell search coherent accumulation lengths to facilitate the inter-frequency measurements with respect to the two or more different bandwidth carriers; code configured to reduce one or more cell search non-coherent accumulation lengths to facilitate the inter frequency measurements with respect to the two or more different bandwidth carriers; code configured to increase an amount of repetition of a transmission gap pattern to facilitate the inter-frequency measurements with respect to the two or more different bandwidth carriers; code configured to increase a length of a transmission gap to facilitate the inter-frequency measurements with respect to the two or more different bandwidth carriers; or code configured to reduce a window size to facilitate the inter-frequency measurements with respect to the two or more different bandwidth carriers.

In some embodiments, separate parameters of the one or more identified parameters are configured to facilitate the inter-frequency measurements with respect to the two or more different bandwidth carriers. The same parameters of the one or more identified parameters may be configured to facilitate the inter-frequency measurements with respect to the two or more different bandwidth carriers.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 shows a table illustrating some compressed mode settings that may be utilized in some embodiments;

FIG. 7 provides a table that shows a comparison of several different embodiments;

DETAILED DESCRIPTION

Figure 1:
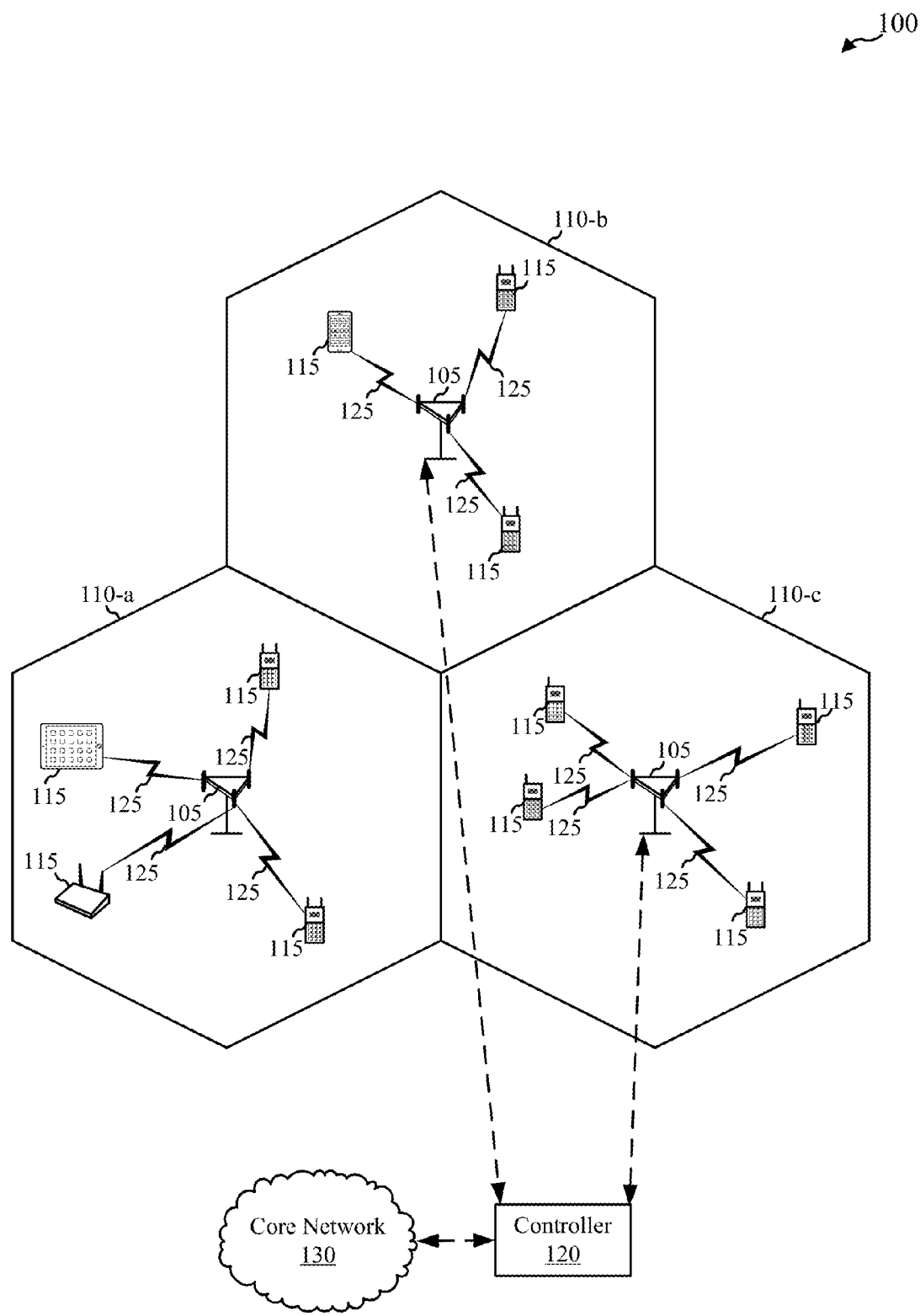
FIG. 1 shows a block diagram of a wireless communications system in accordance with various embodiments.

Methods, systems, and devices are provided that may address problems pertaining to how a radio access network may enable a user equipment (UE) in connected mode on a first bandwidth cell to make inter-frequency measurements on another bandwidth cell. The first bandwidth cell may be a normal bandwidth cell or a flexible bandwidth cell while the second bandwidth cell may be a normal bandwidth cell or a flexible bandwidth cell. A UE connected to a normal bandwidth cell may take measurements on an inter-frequency neighboring normal bandwidth and flexible bandwidth cells to assist the serving normal bandwidth cell in determining possible handover candidates. To enable the inter-frequency measurements, data and control channel may be compressed (e.g., transmitted in a shorter period than normal). For example, a frame that may typically be 15 slots may be compressed to 7 slots for transmission. This may enable the UE to tune to the other frequency during the rest 8 slots to take measurements. The overall tune-away time and patterns (e.g., the compressed mode configuration and/or parameters) may be signaled to the UE by the network through the serving cell. Taking into consideration the signaled parameters, the UE may determine the parameters to use in searching and taking measurements on the inter-frequency cell (e.g., search parameters such as coherent length, non-coherent length, etc.).

Due to the time dilated nature of a reduced bandwidth cell (flexible bandwidth cell with smaller bandwidth than the normal bandwidth cell), parameters used in inter-frequency measurements of normal bandwidth cells may lead to inaccurate measurements for measurements taken on the reduced bandwidth cell or degradation in the performance of the application the UE is communicating with the serving cell. Tools and techniques are provided that may mitigate these problems. Some embodiments address the issue by using one optimized set of parameters for measurements of both normal and flexible bandwidth cells while some other embodiments address the issue by signaling separate parameter configurations for the normal bandwidth and the flexible bandwidth cells Methods, systems, and devices are provided that may address problems pertaining to how a normal bandwidth radio access network may enable a user equipment (UE) in connected mode on a normal bandwidth cell to make inter-frequency measurements on another normal cell and one or more flexible bandwidth cells. Some embodiments utilize a set of compressed mode gap configurations for measuring both normal bandwidth and flexible bandwidth inter-frequency cells with reduced coherent length and non-coherent length used by the UE for inter-frequency flexible bandwidth cell search during the search procedures (for example, with respect to the primary and secondary synchronization channels—P-SCH, S-SCH—and the pilot channel—CPICH). Some embodiments include increasing the power on the one or more control channels in some cases (such as P-SCH, S-SCH, and/or CPICH) to accommodate the loss due to the coherent length reduction and/or non-coherent length reduction. Some embodiments include using the same cell search parameters at the UE but modifying the compressed mode gap parameters to accommodate both normal bandwidth and flexible bandwidth cell search (for example increasing the compressed mode gap length). Another embodiment may include maintaining the compressed mode gap parameters as used for normal bandwidth cells but reducing the search window size during cell search coherent accumulation. Some embodiments may configure separate compressed mode measurements configurations for normal bandwidth and flexible bandwidth measurements by: signaling normal bandwidth configuration first and flexible bandwidth configuration second and activating both simultaneously at the UE; signaling configuration for the flexible bandwidth using an invalid TGPSI; and/or signaling one setting for normal bandwidth cells and after the normal bandwidth measurements are completed, deactivating the configuration for the normal bandwidth and configuring the next for flexible bandwidth. In some embodiments, the UE maps compressed gap configurations for normal cells to compressed gap configurations optimized for flexible bandwidth cells and stored in the UE. Some embodiments include any combination of the above embodiments. Some embodiments utilize normal bandwidth carrier system such as a Universal Mobile Telecommunication System (UMTS) and/or flexible bandwidth carrier systems such as a flexible bandwidth UMTS (F-UMTS). In some cases, the flexible bandwidth carrier system or may involve a reduced bandwidth carrier system or cell.

Flexible bandwidth carrier systems may involve wireless communications systems that may utilize portions of spectrum that may not be big enough to fit a normal waveform utilizing flexible waveforms. Flexible bandwidth carrier systems may refer to as flexible bandwidth carrier systems or flexible bandwidth cells, for example. Similarly, normal bandwidth carrier systems may also refer to as normal bandwidth carrier systems or normal bandwidth cells, for example. A flexible bandwidth carrier system may be generated with respect to a normal carrier bandwidth system through dilating the time (e.g., frame duration), or scaling down the chip rate of the flexible bandwidth carrier system with respect to the normal bandwidth carrier system. Some embodiments increase the bandwidth of a flexible waveform through expanding, or scaling up the chip rate or reducing the time (e.g., frame duration) of the flexible bandwidth carrier system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a controller 120, and a core network 130 (the controller 120 may be referred to as a radio network controller or RNC and may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, mobile device, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

The base stations 105 may wirelessly communicate with the user equipment 115 via a base station antenna. The base stations 105 may be configured to communicate with the user equipment 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-$a$, 110-$b$, or 110-$c$. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates and/or bandwidth scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115 and/or base stations 105) through dilating, or scaling down, the time of the flexible subsystem with respect to the time of the normal subsystem.

In some embodiments, the different aspects of system 100, such as the user equipment 115, the base stations 105, the core network 130, and/or the controller 120 may be configured for inter-frequency measurements for flexible bandwidth carrier systems. In some embodiments the user equipment 115 may be configured for identifying one or more search parameters to facilitate inter-frequency searches with respect to two or more different bandwidth cells, such as one or more flexible bandwidth cells and/or one or more normal bandwidth cells. In some embodiments, identifying the one or more search parameters may include modifying or adjusting existing parameters, receiving the parameters to be used, determining the parameters from stored information, selecting the parameters from an available set of parameters, and/or sending the parameters to another device to facilitate inter-frequency searches.

In some embodiments, the base stations 105, the core network 130, and/or the controller 120 may be configured for identifying one or more compressed mode parameters to facilitate inter-frequency searches with respect to one or more flexible bandwidth cells and/or normal bandwidth cells. In some embodiments, identifying the one or more compressed mode parameters may include modifying or adjusting existing parameters, receiving the parameters to be used, determining the parameters from stored information, selecting the parameters from an available set of parameters, and/or sending the parameters to another device to facilitate inter-frequency searches. For example, the one or more identified parameters may be transmitted to one or more user equipment 115 to facilitate the inter-frequency measurements with respect to the one or more flexible bandwidth cells and/or normal bandwidth cells. The one or more identified parameters, which may include compressed mode parameters or search parameters, may be utilized to perform, by the user equipment 115, one or more inter-frequency measurements with respect to the one or more flexible bandwidth cells and/or normal bandwidth cells.

Some embodiments may include user equipment and/or base stations that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a bandwidth scaling factor. Other embodiments may generate a flexible waveform to fit a portion of spectrum through altering a rate or chip rate (e.g., a spreading factor may change). Some embodiments may change a frequency of processing to change a chip rate or utilize a bandwidth scaling factor. Changing frequency of processing may include changing an interpolation rate, an interrupt rate, and/or a decimation rate. In some embodiments, a chip rate may be changed or a bandwidth scaling factor utilized through filtering, by decimation, and/or by changing a frequency of an analog-to-digital converter (ADC), a digital-to-analog converter (DAC), and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
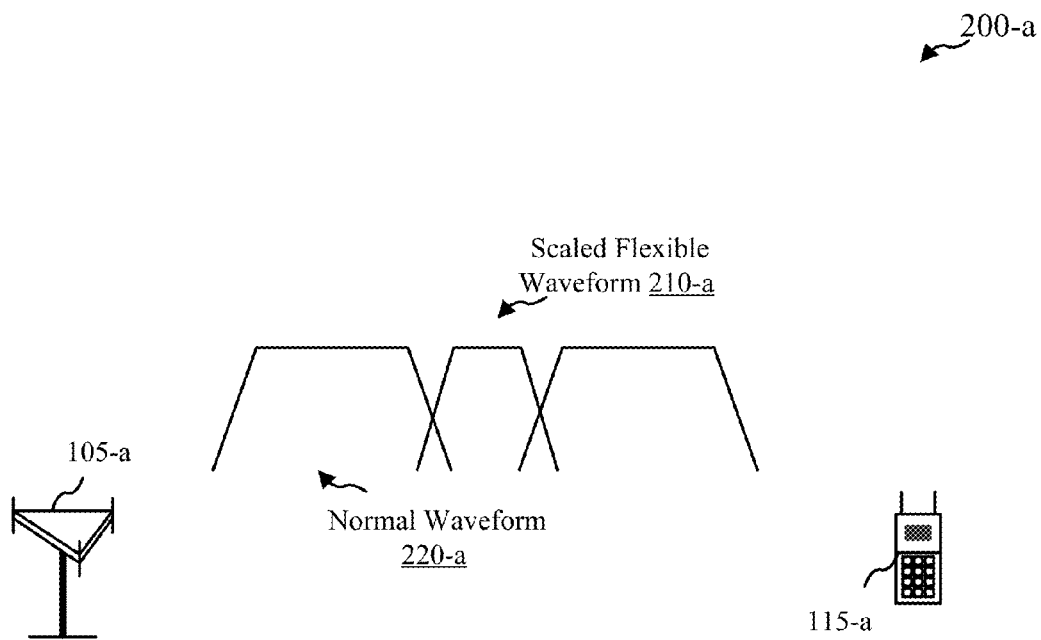
FIG. 2A shows an example of a wireless communications system where a flexible waveform fits into a portion of spectrum not broad enough to fit a normal waveform in accordance with various embodiments.
Figure 2B:
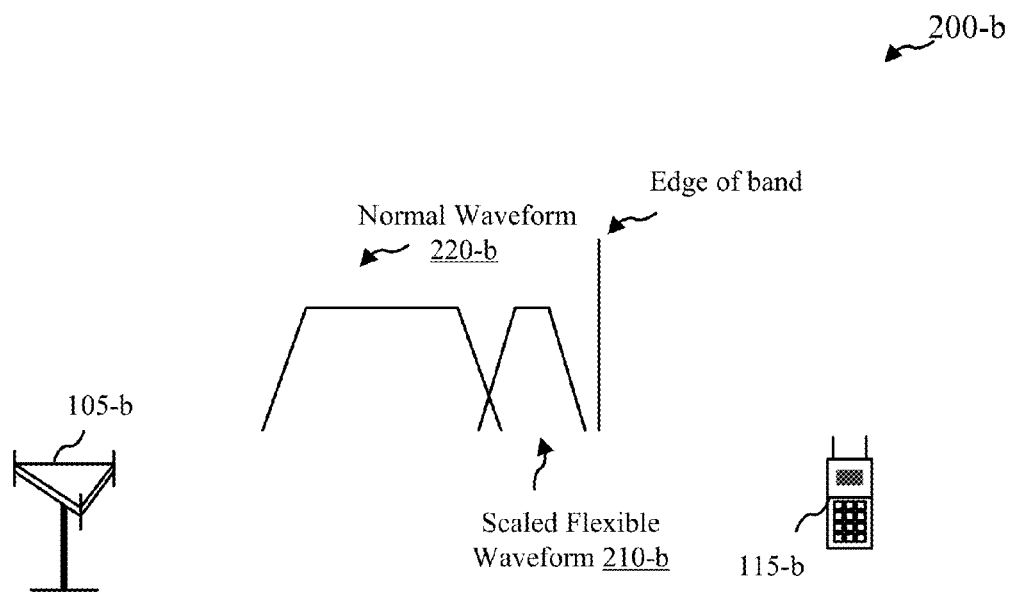
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a user equipment 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a, where the normal waveform 220-a may be transmitted either by the base station 105-a and/or the user equipment 115-a. Some embodiments may also utilize multiple flexible waveforms 210. In some embodiments, another base station and/or user equipment (not shown) may transmit the normal waveform 220-a and/or the flexible waveform 210-a. FIG. 2B shows an example of a wireless communications system 200-b with a base station 105-b and user equipment 115-b, where a flexible waveform 210-b fits into a portion of spectrum near an edge of a band, which may be a guard band, where a normal waveform such as the normal waveform 220-b may not fit. System 200-b may be an example of system 100 of FIG. 1. Similar techniques for supporting voice services utilizing scaled flexible waveform 210-b may be applicable as discussed above.

Figure 3:
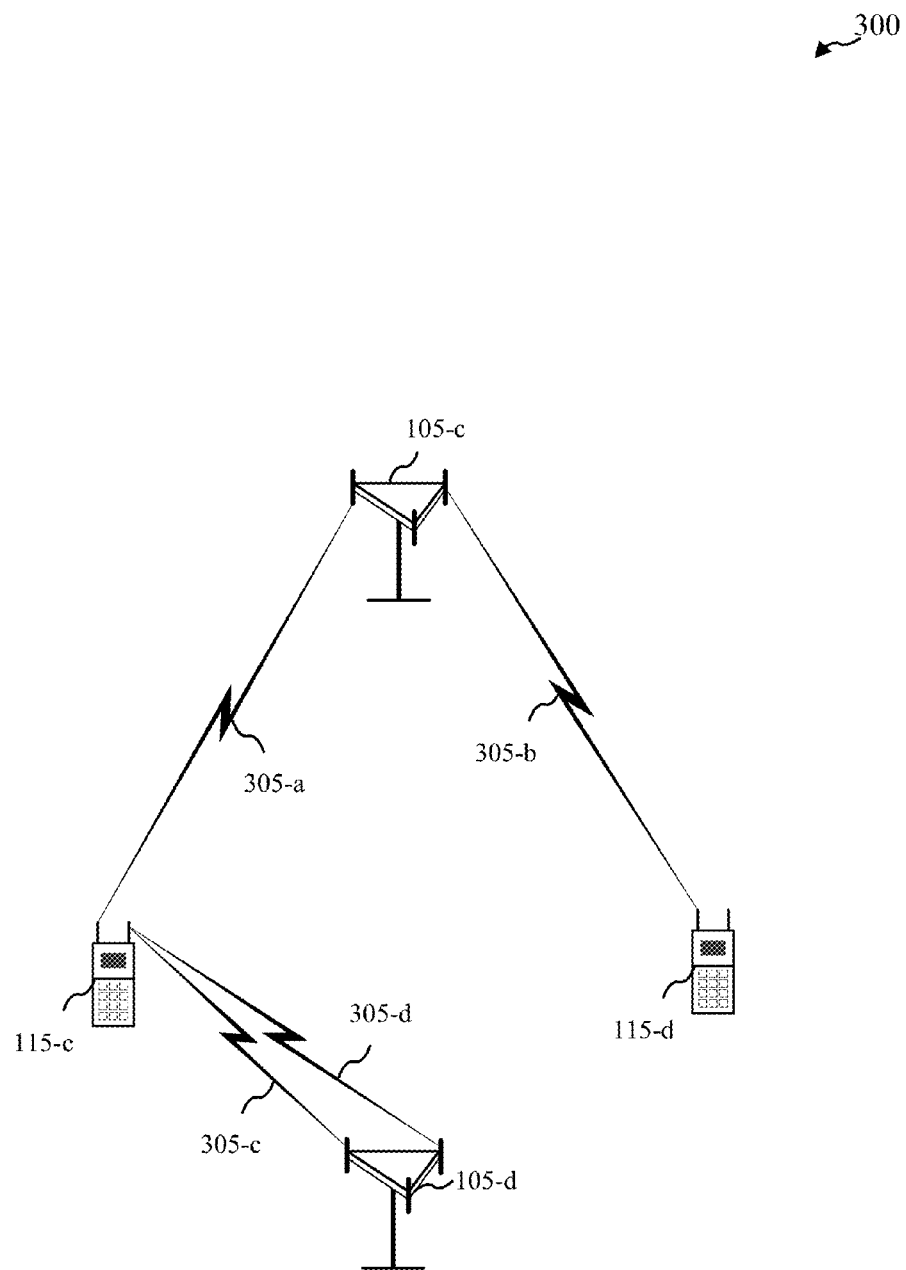
FIG. 3 shows a block diagram of a wireless communications system in accordance with various embodiments.

FIG. 3 shows a wireless communications system 300 with a base station 105-c and 105-d and user equipment 115-c and 115-d, in accordance with various embodiments. In some embodiments, the base stations 105-c/105-d and/or the user equipment 115-c/115-d may be configured for providing services, such as voice services, within a flexible bandwidth carrier system. For example, transmissions 305-a and/or 305-b between the user equipment 115-c/115-d and the base station 105-c may involve transmissions that have been scaled utilizing flexible waveforms.

As shown in FIG. 3, base station 105-c and/or the user equipment 115-c/115-d may communicate through transmissions 305-a and/or 305-b. In some embodiments, base station 105-c may identify one or more parameters (e.g., compressed mode parameters, search parameters) to facilitate inter-frequency searches with respect to two or more different bandwidth cells, such as one or more flexible bandwidth cells and/or normal bandwidth cells. The one or more identified parameters may be transmitted through transmissions 305-a and/or 305-b to one or more user equipment 115-c/115-d to facilitate the inter-frequency measurements with respect to the one or more flexible bandwidth cells and/or normal bandwidth cells, which may include base station 105-d. In some embodiments, user equipment 115-c and/or 115-d may identify, based on the information provided through transmissions 305-a and/or 305-b, one or more parameters configured to facilitate inter-frequency measurements with respect to one or more flexible bandwidth cells and/or normal bandwidth cells, such as base station 105-d. The one or more identified parameters may be utilized to perform one or more inter-frequency measurements with respect to the one or more flexible bandwidth cells and/or normal bandwidth cells, such as base station 105-d.

Transmissions 305-a and/or 305-b between the user equipment 115-c/115-d and the base station 105-c may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a bandwidth scaling factor N with respect to a normal waveform. Bandwidth scaling factor N may take on numerous different values including, but not limited to, integer values such as 1, 2, 4, etc. N, however, does not have to be an integer.

In the example shown in FIG. 3, the base station 105-*d* may support both a flexible bandwidth cell and a normal bandwidth cell, and may support additional cells as well. The user equipment 115-*c*, after identifying the appropriate parameters (e.g., compressed mode parameters, search parameters, timing information) with which to perform one or more inter-frequency measurements, may utilize those parameters to make measurements with respect to the flexible bandwidth cell and the normal bandwidth cell of the base station 105-*d*. Transmissions 305-*c* may be utilized to make the measurements corresponding to the flexible bandwidth cell, while transmissions 305-*d* may be utilized to make the measurements corresponding to the normal bandwidth cell.

Some embodiments may utilize additional terminology. A new unit D may be utilized. The unit D is dilated. The unit is unitless and has the value of N. One can talk about time in the flexible system in terms of "dilated time." For example, a slot of say 10 milliseconds (ms) in normal time may be represented as 10 Dms in flexible time (note: even in normal time, this will hold true since N=1 in normal time; that is, D has a value of 1 in normal time, so 10 Dms=10 ms). In time scaling, one can replace most "seconds" with "dilated-seconds." Note frequency in Hertz is 1/s. Some embodiments may also utilize a chip rate divider ("Dcr"), which may also have the value N.

As discussed above, a flexible waveform may be a waveform that occupies less bandwidth than a normal waveform. Thus, in a flexible bandwidth carrier system, the same number of symbols and bits may be transmitted over a longer duration compared to a normal bandwidth carrier system. This may result in time stretching, whereby slot duration, frame duration, etc., may increase by a bandwidth scaling factor N. Bandwidth scaling factor N may represent the ratio of the normal bandwidth to flexible bandwidth (BW). Thus, data rate in a flexible bandwidth carrier system may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a bandwidth scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a bandwidth scaling factor that may be not equal to one (e.g., N=2, 4, 8, ½, ¼, etc.). For N>1, or if a chip rate is decreased, the bandwidth of a waveform may decrease. Some embodiments may utilize bandwidth scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Figure 4A:
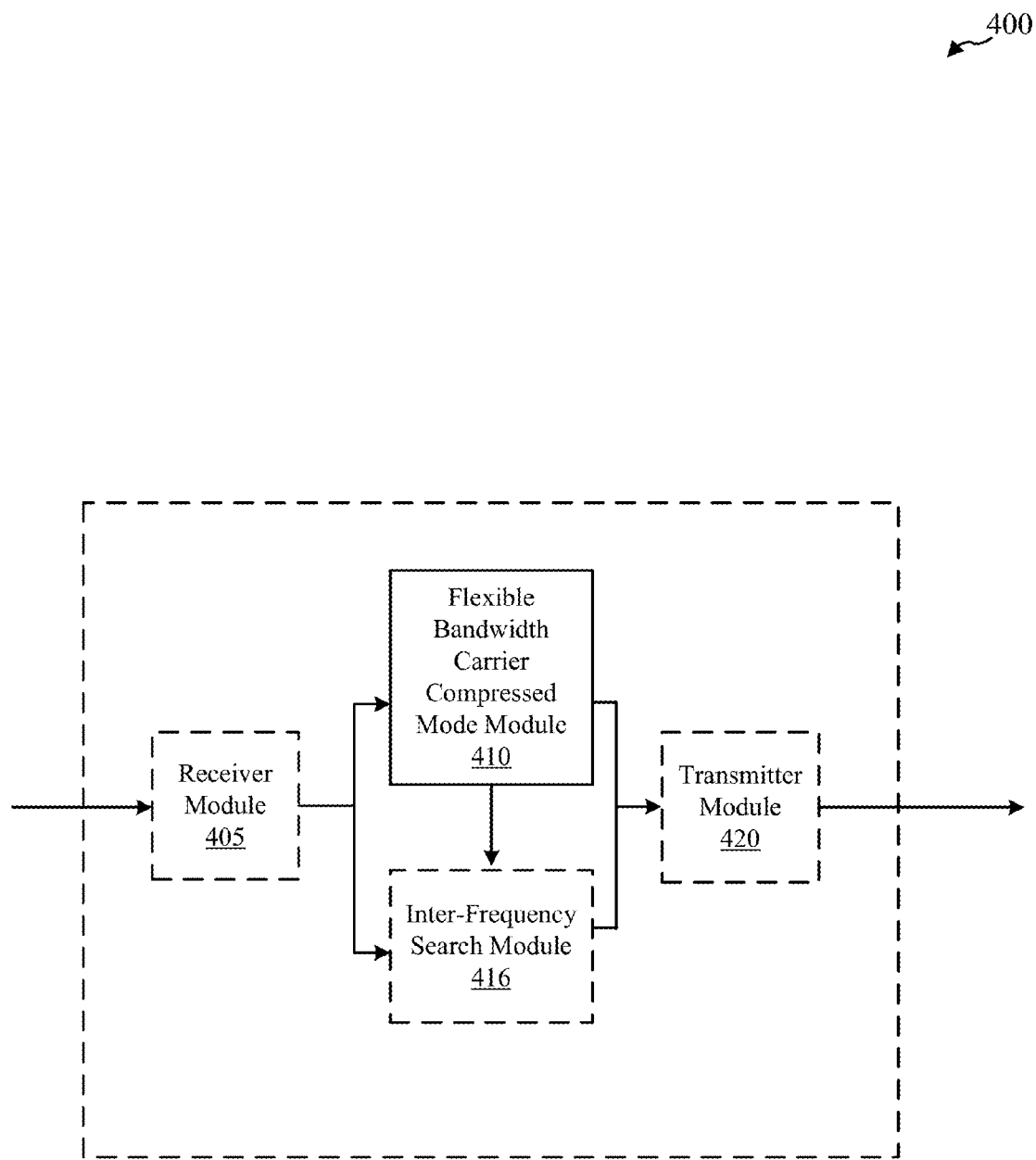
FIG. 4A shows a block diagram of a device configured for facilitating inter-frequency measurements in accordance with various embodiments.

Turning next to FIG. 4A, a block diagram illustrates a device 400 for inter-frequency measurements for flexible bandwidth carrier systems in accordance with various embodiments. The device 400 may be an example of one or more aspects of user equipment 115 described with reference to FIG. 1, FIGS. 2A and 2B, FIG. 3, FIG. 11, FIG. 12, FIG. 14, and/or FIG. 15. The device 400 may also be a processor. The device 400 may include a receiver module 405, a flexible bandwidth carrier compressed mode module 410, an inter-frequency search module 416, and/or a transmitter module 420. Each of these components may be in communication with each other.

Device 400, through the receiver module 405, the flexible bandwidth carrier compressed mode module 410, the inter-frequency search module 416, and/or the transmitter module 420, may be configured for inter-frequency measurements for flexible bandwidth carrier systems. The transmitter module 420 may transmit the measurements taken by the UE to a network in some cases. For example, the flexible bandwidth carrier compressed mode module 410 may be configured to identify one or more parameters to facilitate inter-frequency searches with respect to two or more different bandwidth carriers, such as with respect to one or more flexible bandwidth cells and/or one or more normal bandwidth cells. The one or more identified parameters may include one or more compressed mode parameters, timing information, and/or one or more search parameters. In some embodiments, the receiver module 405 and/or the flexible bandwidth carrier compressed mode module 410 may be configured to receive and/or identify one or more compressed mode parameters configured to facilitate inter-frequency measurements with respect to two or more different bandwidth cells, where at least one of the bandwidth cells includes a flexible bandwidth cell. Some embodiments may facilitate measurements with respect to one or more flexible bandwidth cells and/or normal bandwidth cells. In some embodiments, the receiver module 405 and/or the flexible bandwidth compressed carrier mode module 410 for a user equipment 115 may be configured to receive and/or identify the search parameters that can be used to more efficiently search the flexible bandwidth cells. The one or more identified parameters (e.g., compressed mode parameters, search parameters) may be utilized by the inter-frequency search module 416 to perform one or more inter-frequency measurements with respect to the one or more flexible bandwidth cells and/or normal bandwidth cells.

The identification of one or more parameters that facilitate inter-frequency measurements may include reducing one or more coherent lengths when a UE, through inter-frequency search module 416, is searching for flexible bandwidth cells. Some embodiments of device 400 include identifying the one or more parameters that facilitate inter-frequency measurements by increasing the transmission power of one or more control channels belonging to the flexible bandwidth cell. Some embodiments of device 400 include identifying the one or more parameters that facilitate inter-frequency measurements by increasing an amount of repetition of a transmission gap pattern. Some embodiments of device 400 include identifying the one or more parameters that facilitate inter-frequency measurements by increasing the length of a compressed mode transmission gap. Some embodiments of device 400 include identifying the one or more parameters that facilitate inter-frequency measurements by reducing a window size for coherent accumulation during the cell search procedures especially if the timing information may be signaled by the network to the UE. Some embodiments include transmitting and/or receiving timing information with respect to one or more flexible bandwidth cells to be measured.

In some embodiments of device 400, the one or more identified parameters may be utilized in separate compressed mode measurements with respect to the one or more flexible bandwidth cells and/or normal bandwidth cells. For example, a set of compressed mode parameters may be used for measuring a neighboring flexible bandwidth cell and another set of compressed mode parameters may be used for measuring a normal bandwidth cell. The separate compressed mode measurements may be configured to be utilized simultaneously. Some embodiments include utilizing an invalid transmission gap pattern identifier to facilitate the compressed mode measurement configuration with respect to the one or more flexible bandwidth cells. Some embodiments include utilizing a user equipment response to the signaled invalid transmission gap pattern identifier to differentiate legacy user equipment and user equipment that support the flexible bandwidth cells; this may be performed by transmitter module 420 in some cases. The separate compressed mode measurements may be configured to be utilized at separate times instead of simultaneously.

Figure 4B:
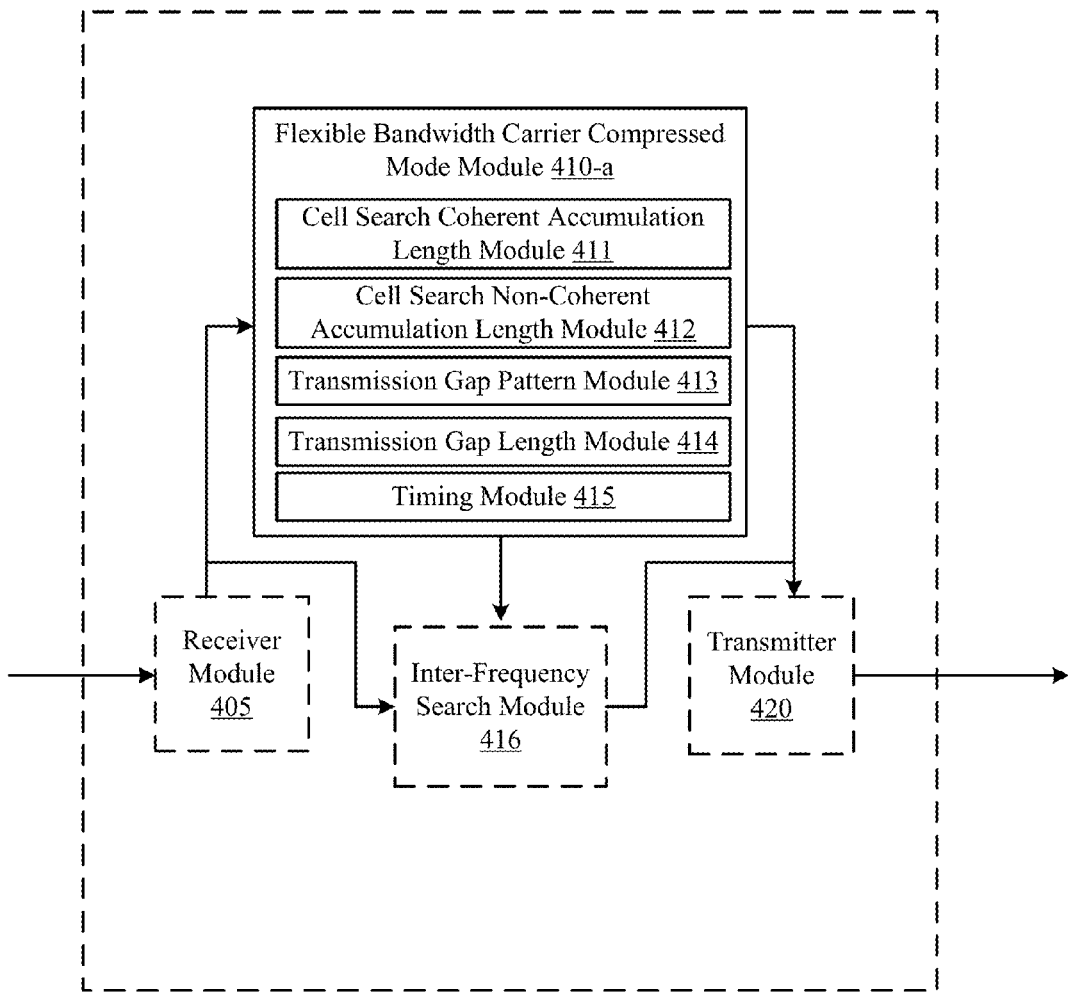
FIG. 4B shows a block diagram of a device configured for facilitating inter-frequency measurements in accordance with various embodiments.

Turning to FIG. 4B, a block diagram illustrates a device 425 for inter-frequency measurements for flexible bandwidth carrier systems in accordance with various embodiments. The device 425 may be an example of the device 400 in FIG. 4A. The device 425 may also be a processor. The device 425 may include the receiver module 405, a flexible bandwidth carrier compressed mode module 410-a, the inter-frequency search module 416, and/or the transmitter module 420. Each of these components may be in communication with each other.

The flexible bandwidth carrier compressed module 410-a may be an example of the flexible bandwidth carrier compressed module 410 in FIG. 4A. The flexible bandwidth carrier compressed module 410-a may include multiple modules to handle various aspects related to identifying one or more parameters to facilitate inter-frequency measurements with respect to the one or more flexible bandwidth cells and/or normal bandwidth cells. A cell search coherent accumulation length module 411 may be configured to reduce one or more cell search coherent lengths when a UE, through inter-frequency search module 416, is searching for flexible bandwidth cells. A cell search non-coherent accumulation length module 412 may be configured to reduce one or more non-coherent lengths when the UE is searching for flexible bandwidth cells. A transmission gap pattern module 413 may be configured to increase an amount of repetition of a transmission gap pattern when the UE is searching for flexible bandwidth cells. A transmission gap length module 414 may be configured to increase the length of a compressed mode transmission gap when the UE is searching for flexible bandwidth cells. A timing module 415 may be configured to reduce a window size for coherent accumulation during the cell search procedures. The network may send timing information to the UE that allows the UE to reduce the window size. In general, the transmission gap pattern, transmission gap length and window sizes may be determined by a network and signaled to device 425. Device 425, through transmission gap pattern module 413, transmission gap length module 414, and/or timing module 415, interpret the parameters based on the bandwidth scaling factor of the system it may be measuring or based on the bandwidth scaling factor of the serving cell.

Figure 4C:
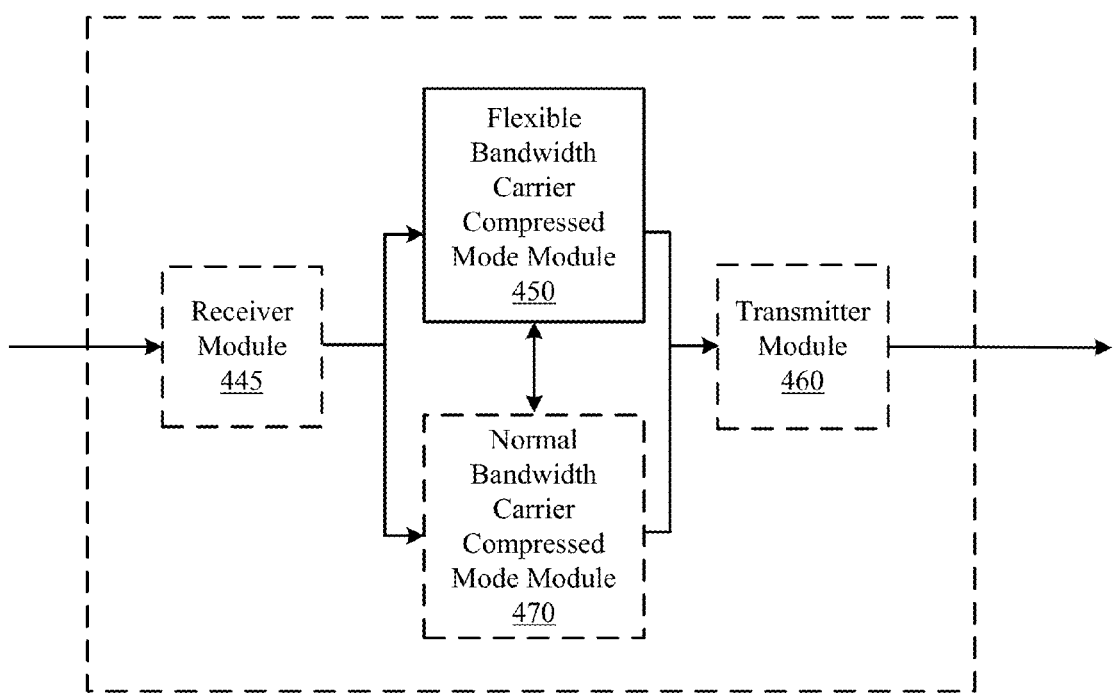
FIG. 4C shows a block diagram of a device configured for facilitating inter-frequency measurements in accordance with various embodiments.

Turning next to FIG. 4C, a block diagram illustrates a device 430 for inter-frequency measurements for flexible bandwidth carrier systems in accordance with various embodiments. The device 430 may be an example of one or more aspects of base stations 105 described with reference to FIG. 1, FIGS. 2A and 2B, FIG. 3, FIG. 11, FIG. 13, and/or FIG. 15; and/or controller 120 of FIG. 1 and/or FIG. 15. The device 430 may also be a processor. The device 430 may include a receiver module 445, a flexible bandwidth carrier compressed mode module 450, a normal bandwidth carrier compressed mode module 470, and/or a transmitter module 460. Each of these components may be in communication with each other. In some cases, aspects of device 430 may be split over both a base station 105 and the controller 120. For example, the transmitter module 460 and/or receiver module 445 may typically in the base station 105, while flexible bandwidth carrier compressed mode module 450 and/or normal bandwidth carrier compressed mode module 470 may be part of a controller 120. The flexible bandwidth carrier compressed mode module 450 and/or normal bandwidth carrier compressed mode module 470 may be combined into one module. The normal bandwidth carrier compressed mode module 470 may determine and signal the normal bandwidth compressed parameter to a user equipment 115 in some cases.

Device 430, through the receiver module 445, the flexible bandwidth carrier compressed mode module 450, and/or the transmitter module 460, may be configured for inter-frequency measurements for flexible bandwidth carrier systems. For example, the flexible bandwidth carrier compressed mode module 410 may be configured to identify one or more parameters to facilitate inter-frequency searches with respect to two or more different bandwidth carriers, such as with respect to one or more flexible bandwidth cells and/or one or more normal bandwidth cells. The one or more identified parameters may include one or more compressed mode parameters, timing information, and/or one or more search parameters. The one or more identified parameters may be transmitted through transmitter 460 to one or more user equipment to facilitate the inter-frequency measurements with respect to the one or more flexible bandwidth cells and/or normal bandwidth cells.

The identification by the device 430 of one or more parameters that facilitate inter-frequency measurements may include reducing one or more coherent lengths for searching for flexible bandwidth cells. Some embodiments of device 430 include identifying the one or more parameters that facilitate inter-frequency measurements by increasing the transmission power on one or more control channels belonging to the measured cell, which may be a measured flexible bandwidth cell. Some embodiments of device 430 include identifying the one or more parameters that facilitate inter-frequency measurements by increasing an amount of repetition of a transmission gap pattern. Some embodiments of device 400 include identifying the one or more parameters that facilitate inter-frequency measurements by increasing the length of a compressed mode transmission gap. Some embodiments of device 400 include identifying the one or more parameters that facilitate inter-frequency measurements by reducing a window size for coherent accumulation that is used during the cell search procedures especially when the timing information may be signaled by the network to the UE making the cell search. Some embodiments include transmitting and/or receiving timing information with respect to one or more flexible bandwidth cells to be measured.

In some embodiments of device 430, the one or more identified parameters may be utilized in separate compressed mode measurements with respect to the one or more flexible bandwidth cells and/or normal bandwidth cells. For example, a set of compressed mode parameters can be used for measuring a neighboring flexible bandwidth cell and another set of compressed mode parameters may be used for measuring a normal bandwidth cell. The separate compressed mode measurements may be configured to be utilized simultaneously. The separate compressed mode measurements may be configured to be utilized at separate times instead of simultaneously.

Figure 4D:
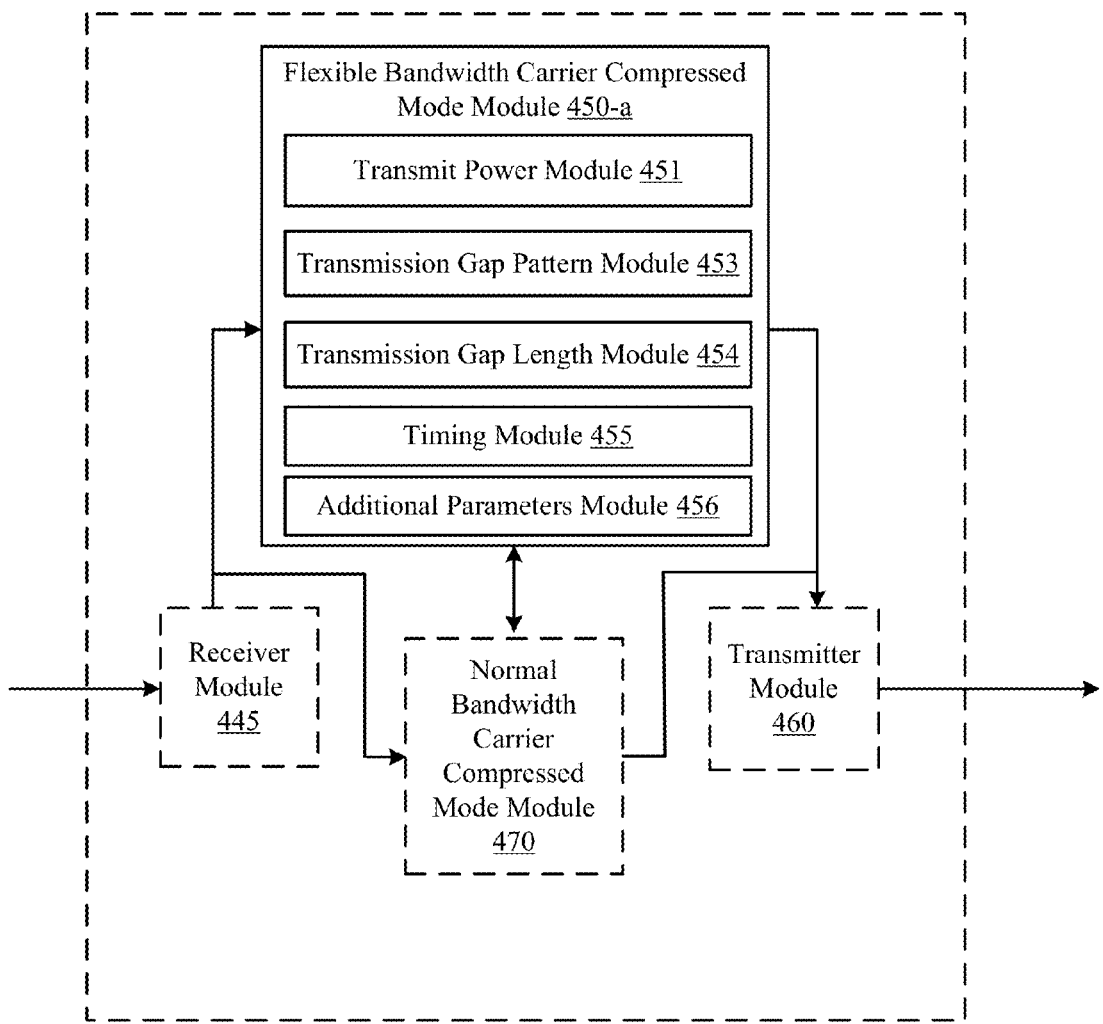
FIG. 4D shows a block diagram of a device configured for facilitating inter-frequency measurements in accordance with various embodiments.

Turning to FIG. 4D, a block diagram illustrates a device 435 for inter-frequency measurements for flexible bandwidth carrier systems in accordance with various embodiments. The device 435 may be an example of the device 430 in FIG. 4C. The device 435 may also be a processor. The device 435 may include the receiver module 445, a flexible bandwidth carrier compressed mode module 450-a, and/or the transmitter module 460. Each of these components may be in communication with each other. In some cases, aspects of device 435 may be split over both a base station 105 and the controller 120. For example, the transmitter module 460 and/or receiver module 445 may typically in the base station 105, while flexible bandwidth carrier compressed mode module 450-a and/or normal bandwidth carrier compressed mode module 470 may be part of a controller 120. The flexible bandwidth carrier compressed mode module 450-a and/or normal bandwidth carrier compressed mode module 470 may be combined into one module. The normal bandwidth carrier compressed mode module 470 may determine and signal the normal bandwidth compressed parameter to a user equipment 115 in some cases.

The flexible bandwidth carrier compressed module 450-a may be an example of the flexible bandwidth carrier compressed module 450 in FIG. 4C. The flexible bandwidth carrier compressed module 450-a may include multiple modules to handle various aspects related to indentifying one or more parameters to facilitate inter-frequency measurements with respect to the one or more flexible bandwidth cells and/or normal bandwidth cells. A transmission gap pattern module 453 may be configured to increase an amount of repetition of a transmission gap pattern that is used when a UE is searching for flexible bandwidth cells. A transmission gap length module 454 may be configured to increase the length of a compressed mode transmission gap that is used when a UE is searching for flexible bandwidth cells. A timing module 455 may be configured to reduce a window size for coherent accumulation that is used during cell search procedures. The network may send timing information to the UE that allows the UE to reduce the window size. An additional parameters module 456 may be configured to modify other compressed mode parameters such as one or more of the parameters described with respect to FIG. 6.

Some embodiments of flexible bandwidth carrier compressed module 450-a may include a transmit power module 451. The transmit power module 451 may be part of the transmitter module 460. In some cases, power increase for channels such as P-SCH, S-SCH and CPICH may be implemented in implemented at the base station 105 or the controller 120. A controller 120 may determine the transmit power and signal the value to the base station 105.

The components of the devices 400, 425, 430, and 435 in FIGS. 4A, 4B, 4C, and/or 4D may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 5:
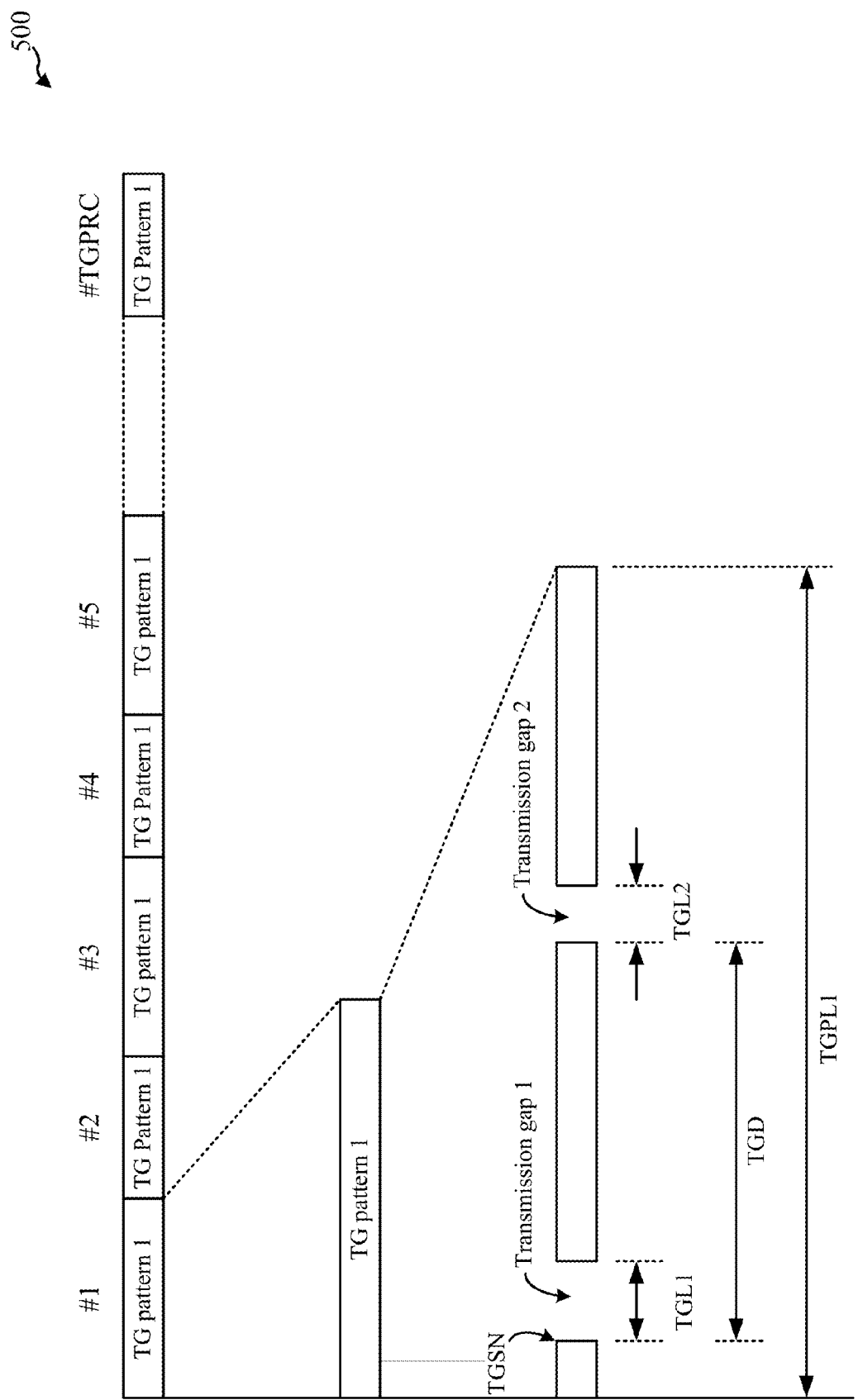
FIG. 5 provides an illustration of compressed mode pattern parameter diagram that may be utilized in some embodiments.

A compressed mode pattern sequence can be configured for each of the following measurements purpose using the parameter, Transmission gap measurement purpose (TGMP): FDD, TDD, GSM carrier RSSI measurement, Initial BSIC identification; and/or BSIC re-confirmation. Some embodiments may utilize the FDD purpose for inter-frequency measurements involving normal bandwidth and flexible bandwidth cells. FIG. 5 provides an illustration of compressed mode parameters 500 (see 3GPP TS 25.215, for example) that may be utilized in some embodiments. In some embodiments, the network may signal the UE to use a transmission gap sequence to make the inter-frequency measurements. A sequence may include multiple patterns; the number of patterns in a sequence is indicated by the parameter TGPRC. Within a transmission gap pattern which lasts for TGL1 slots, there are typically two compressed gap with slot lengths, TGL1 and TGL2. These gaps may be separated by a time duration TGD slots. The first gap with length TGL1 slots may start on slot number TGSN of the frame with connection number TGCFN. FIG. 6 shows a table 600 illustrating some compressed mode settings, typical ranges and descriptions of some compressed mode parameters that may be utilized in some embodiments. Some embodiments may utilize different measurement configurations for the flexible bandwidth and normal bandwidth. Some embodiments may also utilize different messages when signaling these parameters to the network. For example, definition of compressed gap pattern sequence call may be signaled by the network to the user equipment 115 at call set-up using the Radio Bearer set-up message; or after call set-up using the Physical Channel reconfiguration message. The compressed gap pattern sequence can then be activated after call set-up using the Measurement control or Physical Channel reconfiguration message. After the sequence activation, the UE can be ordered by the network to use the compressed gap pattern configurations for inter-frequency measurements. This may be done after call set-up using the measurement control message. Searching for a flexible bandwidth carrier systems may involve more compressed mode gaps than is used for the normal bandwidth. For example, as the bandwidth scaling factor N increases, to accumulate samples, there may not be enough time to perform different inter-frequency measurements. In addition, there are embodiments where the bandwidth scaling factor of the flexible bandwidth cell is not signaled to the user equipment. This may involve that the UE perform multiple hypothesis for the bandwidth during cell search. Some embodiments may provide different solutions.

Some embodiments may utilize one FDD compressed mode (CM) configuration and/or parameters for making inter-frequency measurements on both normal bandwidth carrier systems (e.g., UMTS) and flexible bandwidth carrier systems (e.g., F-UMTS). In some embodiments where the same configuration is used for both normal and flexible bandwidth carrier (e.g. reduced bandwidth carrier), the coherent accumulation length and non-coherent accumulation length used by the UE for inter-frequency flexible bandwidth measurements with one or more control channels, such as P-SCH, S-SCH and/or CPICH, may be reduced. This reduction may be due to the time dilation of the frame duration of reduced bandwidth carrier. For example assuming the UE takes continuous samples within a time period T during TGL1 (where T<=TGL1) on a normal carrier system, if the UE uses a sampling rate, R, while taking the measurement, then the number of samples that the UE accumulate within this period may be T/R. When the UE takes measurement samples within the same period T on a flexible bandwidth system (with reduced bandwidth) due to the dilation of the frame period, the sampling rate maybe adjusted to R*N, where N (N>1) is the bandwidth scaling factor of the flexible bandwidth carrier, the number of samples with period T is T/(R*N)<T/R. This reduction in the coherent length may result in inaccurate measurements (e.g., averages of the samples) due to insufficient samples. On the other hand, the same sampling rate may used for the measurements on the flexible and normal carriers as used on the normal carrier. In this case, although the same number of samples may be obtained for both systems, the samples obtained from the flexible bandwidth system are more correlated. Therefore, measurements such as averages of the samples may also be inaccurate due to insufficient samples. For non-coherent accumulation, where the UE obtains multiple coherent measurements (indicated by the non-coherent accumulation length), if the sampling rate is adjusted for the flexible bandwidth system then the non-coherent length may be reduced; otherwise, if the sampling rate is kept the same, the same number of samples may be obtained on both the flexible and normal bandwidth system but the accuracy of the measurements on the flexible bandwidth may still be degraded due to correlation of the samples. Inaccurate and adequate measurements may lead to losses and degraded performance. Therefore, to compensate for the losses, in flexible bandwidth systems, the transmission powers of control channels used for cell searches such as the P-SCH, S-SCH and/or CPICH may be increased by the network. Some embodiments may utilize the same coherent length and non-coherent length as for a normal bandwidth carrier system with CM parameter adjustments may be made to accommodate the flexible bandwidth system. For example, the TGP1, TGPL1, and/or TGPRC may be increased for both normal and flexible bandwidth systems. In some embodiments, timing information may be signaled to UE to assist during coherent accumulation. For example a parameter used during coherent accumulation known as the window size which may determine the multiple hypothesis of the start of one coherent accumulation may be signaled by the network to the UE. This may reduce the number of measurements (samples) the UE may need to make.

In some embodiments, when the UE receives a value from the network for a compressed mode parameter e.g. TGL1 (a parameter in units of slots as shown in FIG. 6), the UE may interpret the time duration based on the bandwidth scaling factor of the cell from which the UE received the parameter not the bandwidth scaling factor of the cell from which the UE will be making the measurements. To generalize this notion, when only one configuration may be used by both N>1 and N=1 systems, to avoid a degradation in the current application being communicated between the UE and the serving cell, the UE may determine the value of the time-dependent compressed mode parameter to use during neighboring cell inter-frequency measurement based on this equation:

$$T = \text{floor}(Z*U\_N\_\text{serving}, Z*U\_N\_\text{measured}).$$

Z may be the time-dependent compressed mode parameter e.g. TGL1; U_N_serving may be the units based on the N of the serving cell; and/or U_N_measured may be the units based on the N of the measured cell.

For example, N_serving=1, N_measured=2, if TGL1=7 is signalled, then Z*U_N_serving=7 slots (one slot=⅔ ms) and Z*U_N_measured=7*⅔*2 ms. To avoid degrading the UEs connection on the serving N=1 system, the UE in this case may only take a period of floor (7*⅔*2, 7*⅔)ms=7*⅔ for measurements.

Some embodiments may involve changing, modifying, or adjusting a search parameter such as decreasing a coherent length and/or a non-coherent length. For example, for a given transmission gap length such as 7 slots, performance may be improved through decreasing the coherent length for the search procedures that are required to determine the slot and frame timing of the inter-frequency cell. The decreased coherent length may depend upon a bandwidth scaling factor. For example, for N=2, the coherent length might be reduced by a half. Some embodiments may include increasing control channel power (e.g., P-SCH, S-SCH, and CPICH power). Other channel power may be kept constant, increased, or reduced in some cases. Increasing power on one or more control channels for the flexible bandwidth cells may compensate for performance loss in the reduction of the coherent length. The increase in control channel power may result in a control channel Ec/Io (Ec/Io is the received chip energy divided the Interference plus noise) improvement which may improve the detectability of the control channels.

Merely by way of example, reduction in coherent length may involve reducing the Dchips for one or more parts of a search operation where Dchips represents N (the bandwidth scaling factor) chips. For example, during cell search slot timing procedure, coherent accumulation over X Dchips may be reduced to X/2 Dchips.

Some embodiments may utilize control channel power increases (e.g., P-SCH, S-SCH and/or CPICH), which may help compensate for a decreased coherent length and/or non-coherent length. In a first set of embodiments, the total power on a flexible bandwidth cell (e.g., F-UMTS cell) may be increased compared to that of a normal bandwidth cell (e.g., UMTS); this may involve increasing the Power Spectral Density (PSD) of the F-UMTS cell in addition to reducing the coherent length. A second set of embodiments may keep the total power on the flexible bandwidth cell (e.g., F-UMTS) lower than on the normal bandwidth cell (e.g., UMTS). Merely by way of example, the total power on the flexible bandwidth cell with N=2 may be 3 dB lower than the normal bandwidth cell. The PSD may be the same as for the normal bandwidth cell, but may involve increasing the power on the P-SCH, S-SCH and/or CPICH. This may involve trading power between control channels, for example, taking some power from the S-SCH and putting it on the P-SCH or taking power from data channels or other control channels. A third set of embodiments may involve increasing power on the flexible bandwidth cell (e.g., F-UMTS) due to increasing the power only on the P-SCH, S-SCH and/or CPICH. FIG. 7 provides a table 700 that shows a comparison of these different sets of scenarios in accordance with various embodiments. The specific values utilized in the different sets of scenarios described in table 700 are for illustration purposes only. Other embodiments may utilize other values.

With respect to the first set of embodiments, in interference-limited scenarios, power increase may not result in an equivalent Ec/Io increase at the receiver. For example, a total power increase in 3 dB may not result to 3 dB Ec/Io increase at the receiver. With respect to the second set of embodiments, Received Signal Code Power (RSCP, a measure of the cell coverage) may be the same as UMTS but the Ec/Io at cell edge may be higher, such as 3 dB higher for the example discussed above. The power increase may come from other control channels and/or data channel. Some embodiments may avoid taking power out of the data channel to compensate the degradation in CPICH search performance. For the third set of embodiments, the extra power (e.g., 3 dB) left over in the N=2 flexible bandwidth cell (e.g., F-UMTS baseline in FIG. 7) can be used to boost the Ec/Io in one or more control channels (e.g., P-SCH, S-CH and CPICH Ec/Io). The improvement may help compensate for the performance change that occurs with decreasing the coherent length. The improvement in Ec/Io may, in some instances, involve a network redesign.

Some embodiments may increase the number of times a transmission gap pattern occurs within a transmission gap pattern sequence. This may involve an increase of a TPRC length. To compensate for the impact of multiple hypothesis (e.g., searching for flexible bandwidth cells utilizing different bandwidth scaling factors) the TPRC length may be increased.

Some embodiments may increase the Ec/Ior for the P-SCH, S-SCH and CPICH without increasing total power, such as with some of the embodiments for the second set of embodiments discussed above. The power increase may be from other channels in the cell (e.g., data channel and/or S-SCH). Merely by way of example, from S-SCH, Ec/Ior=−15 dB may be the same power as P-SCH in N=1 so the P-SCH Ec/Ior because −12 dB. Merely by way of example, for the CPICH, 3 dB power increase assuming power from the data channel (e.g., the DPCH or HS-PDSCH with Ec/Ior DPCH=−16.7 dB (2% of total power)), the power may to be taken from multiple data channels (e.g., 5 data channels). This may lead to a reduction in data throughput by ½ or voice quality or number of users or a combination thereof.

Figure 8:
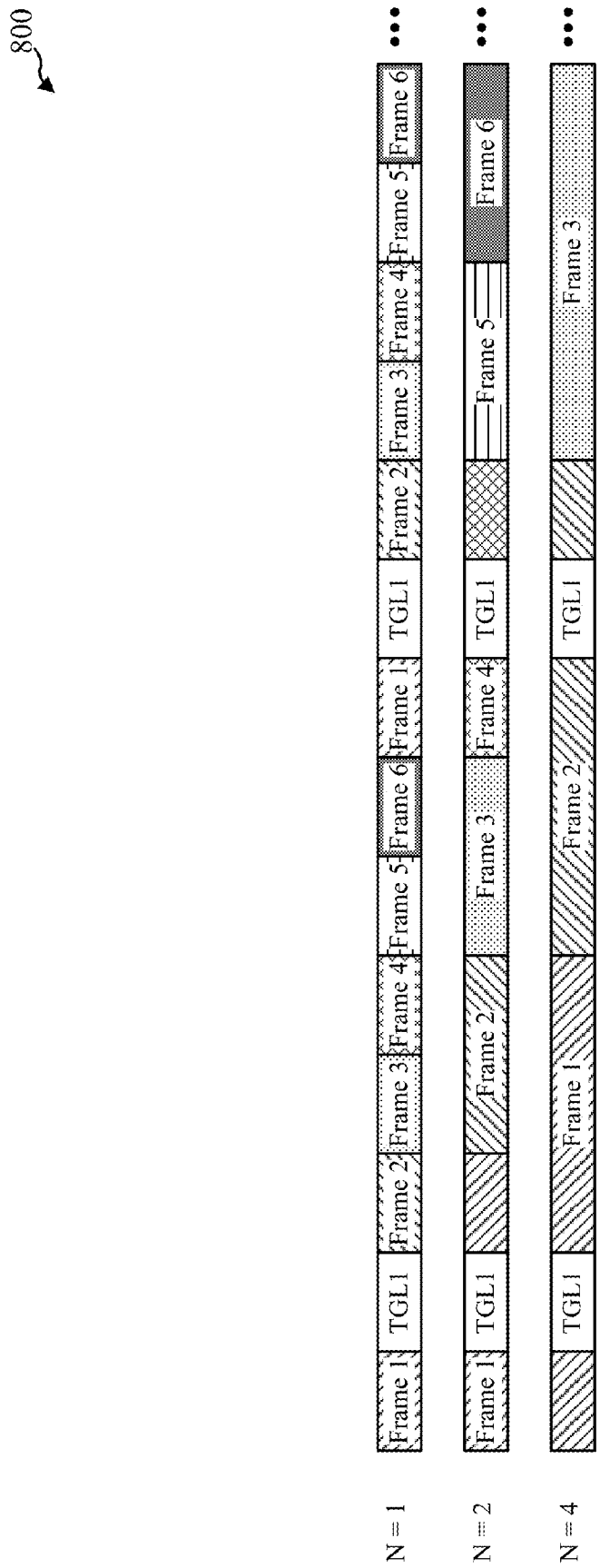
FIG. 8 shows a diagram illustrating increasing the transmission gap size in accordance with various embodiments.

Some embodiments may include increasing a transmission gap length. This may involve, for example, increasing a transmission gap length (TGL) through increasing a number of slots for the TGL, such as TGL1. For example, a Power Spectral Density (PSD) for a flexible bandwidth carrier system (e.g., F-UMTS) may be the same as for a normal bandwidth carrier system (e.g., UMTS) (which may be co-located), and the TGL1 may be increased to 10 slots instead of 7 slots. Other transmission gap lengths and/or slot number increases may be utilized. Some embodiments may utilize configured compressed pattern sequence parameters for both the normal bandwidth carrier system (e.g., UMTS) and flexible bandwidth carrier system (e.g., F-UMTS). FIG. 8 shows an example 800 of increasing the transmission gap size in accordance with various embodiments. The example 800 illustrates the frame duration cases when the serving cell has bandwidth scaling factor N=1 and the inter-frequency neighboring cells have bandwidth scaling factors N=2, and N=4 cells. As discussed earlier, it may be recommended that the UE interprets the signaled compressed mode parameters based on the scaling factor of the serving cell, therefore, if TGL1=7 slots may produce accurate results for N=1 cell measurements, when the UE makes measurement in cells N=2 and N=4 because of the frame dilation, an increase in TGL1 to 10 slots may be required to obtain the same measurement integrity.

Some embodiments may involve reducing a window size. For example, some embodiments may utilize a PSD for flexible bandwidth carrier system (e.g., F-UMTS) that is the same as normal bandwidth carrier system (e.g., UMTS). Some embodiments may utilize same compressed mode parameters for normal bandwidth system, such as TGL1 with 7 slots. Some embodiments may involve reducing the window size during cell search coherent accumulation. Some embodiments may involve the RNC signaling the timing of the inter-frequency flexible bandwidth cells to be measured to the UE. For example, with the timing information of the neighboring cell, in some embodiments the UE may be able to reduce the window size for the coherent accumulation by half. Some embodiments may include power boosting of one or more control channels, such as the P-SCH, S-SCH and/or CPICH to compensate the loss due to the window size reduction.

For embodiments that involve utilizing one set of compressed mode parameters for both the normal and flexible bandwidth cells, legacy (non-flexible bandwidth) UEs may be minimally impacted. This is due to the fact that only one configuration may be signaled and in some cases only one set of neighboring cells (e.g. comprising normal and F-UMTS cells) may be signaled to both legacy and flexible UE. In this case, both type of UEs may measure the F-UMTS frequencies. The flexible bandwidth may detect the UE while the legacy UE may not. In addition, the legacy UEs and the UTRAN may require no new interpretation of messages since standard messages are used. In addition, the legacy UE may use the cell search parameters assuming normal bandwidth cell. On the other hand, as discussed earlier, the flexible bandwidth UE may interpret the signaled parameters based on bandwidth scaling factor of cell from which the parameter is received but may need to modify the search parameters based on the bandwidth scaling factor of the cells to be measured. For embodiments that involve utilizing one set of compressed mode parameters for both the normal and flexible bandwidth cells, no additional signaling may be involved.

Some embodiments include a UE creating compressed gap configurations, which may be optimized for flexible bandwidth carrier system corresponding to compressed gap configurations for normal bandwidth carrier system. Some embodiments include a UE storing compressed gap configurations, which may be optimized for flexible bandwidth carrier system corresponding to compressed gap configurations for a normal bandwidth carrier system. Some embodiments include a UE mapping compressed gap configurations transmitted by base stations for searching normal cells to compressed gap configurations, which may be optimized for flexible bandwidth cells and stored in the UE.

Some embodiments of devices 400 and 425 may utilize separate FDD CM measurement for normal bandwidth carrier system (e.g., UMTS) and flexible bandwidth carrier system (e.g., F-UMTS) measurements. Some embodiments configure simultaneous flexible (e.g., F-UMTS) and normal (e.g., UMTS) FDD CM measurement configuration. Some embodiments may utilize an invalid TGPSI for the F-UMTS FDD CM measurement configuration. Some embodiments allow separate configurations used at different times (time sharing configurations).

Some embodiments may configure two compressed mode parameters for the FDD TGMP. The first set of parameters may be utilized for normal bandwidth carrier systems measurements, such as for UMTS, and the second set of parameters may be utilized for flexible bandwidth carrier systems measurements, such as F-UMTS. The first configuration may be active while the second configuration may be defined but not activated in some cases. The activation of the second gap pattern sequence may be based on the reception of a measurement control message.

A flexible bandwidth capable UE, such as a F-UMTS UE, may interpret the first configuration as to used for normal bandwidth (e.g., UMTS) inter-frequency cells measurements and the second configuration for flexible bandwidth carrier system (e.g., F-UMTS) inter-frequency cells measurements. For a legacy UE, at the reception of an activation for the second gap pattern sequence with the same TGMP, the UE may send a measurement control failure packet to the network.

Figure 9:
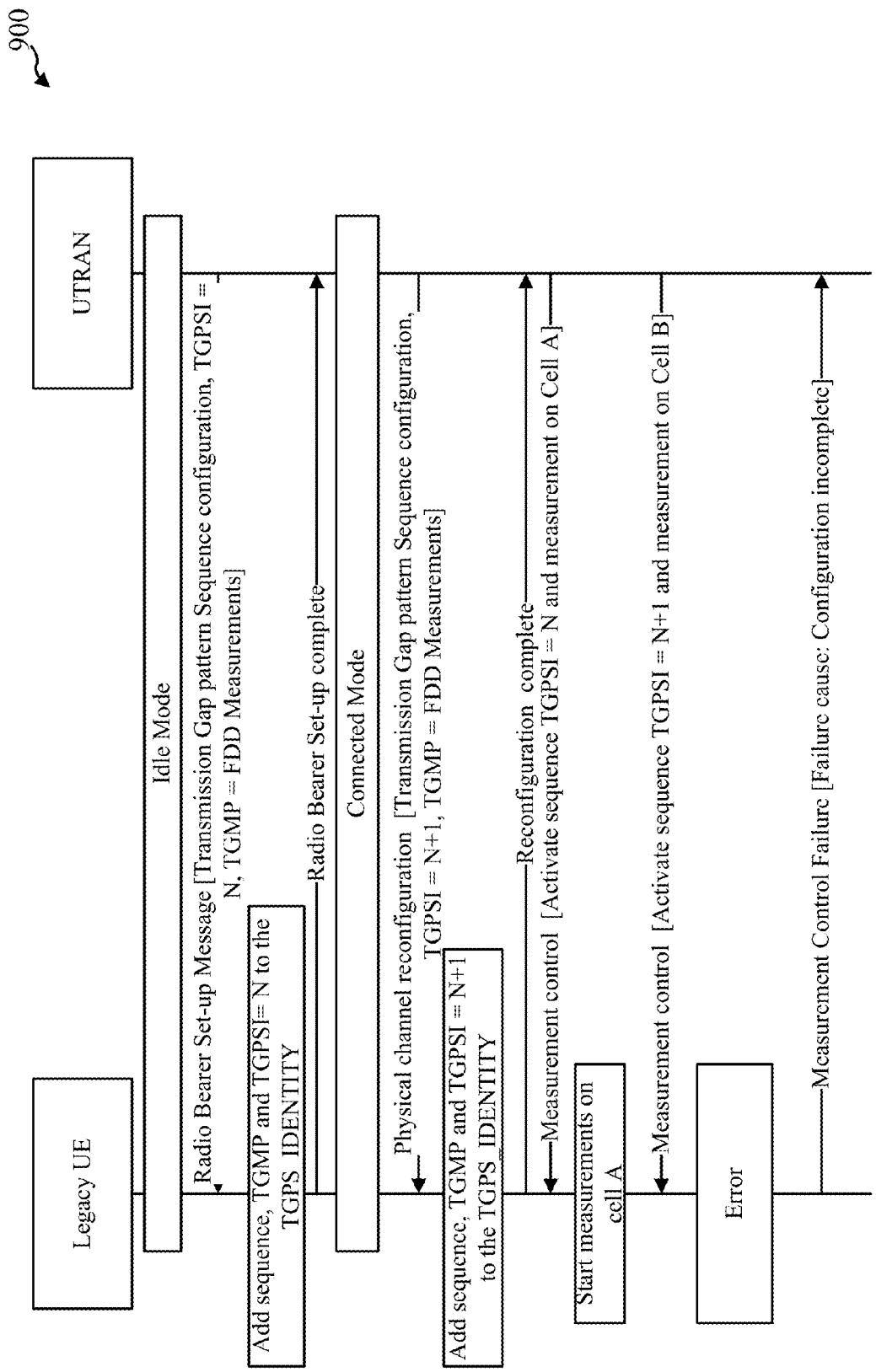
FIG. 9 shows a call flow for a legacy UE in accordance with various embodiments
Figure 10:
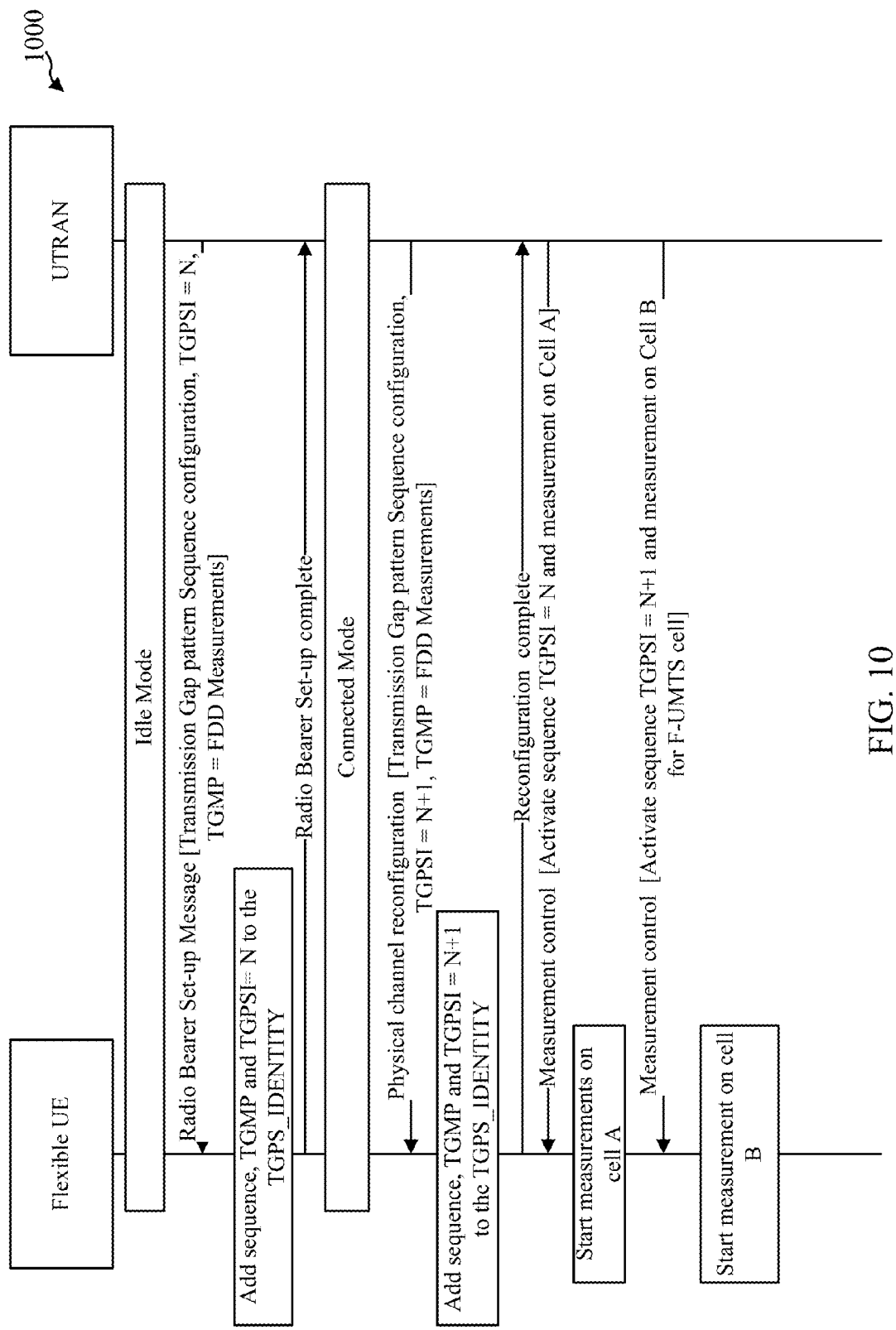
FIG. 10 shows a call flow for flexible bandwidth capable UE in accordance with various embodiments.

Some embodiments may utilize FDD configurations that are maintained. In some cases, the RAN's (e.g., UTRAN's) reception of a measurement control failure from a UE may indicate the UE is a legacy device. In some cases, legacy UEs may not search for flexible bandwidth (e.g., F-UMTS) cells since the latest configuration is in error. Specific cells to measure may be indicated in the measurement control message by the IE "cell for measurement". Some embodiments may involve an increase in downlink and uplink signaling due to transmission of a second measurement control message and/or the measurement control failure packet. The normal bandwidth carrier system (e.g., UMTS) inter-frequency compressed gap configuration may be defined first in some cases. FIG. 9 shows an example of a legacy UE call flow 900 in accordance with various embodiments. FIG. 10 shows an example of a flexible bandwidth capable UE call flow 1000 in accordance with various embodiments.

Figure 11:
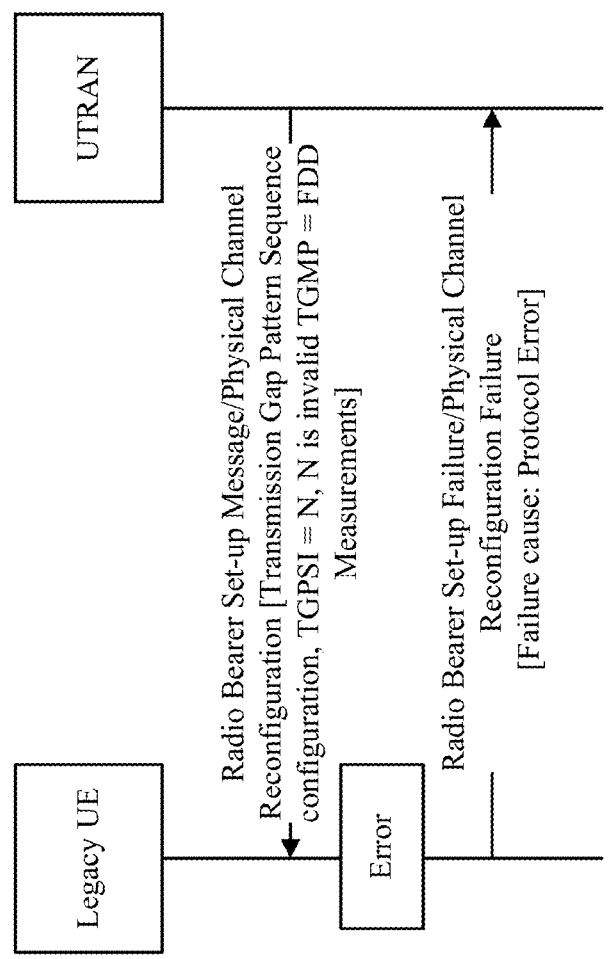
FIG. 11 shows a call flow for a legacy UE in accordance with various embodiments
Figure 12:
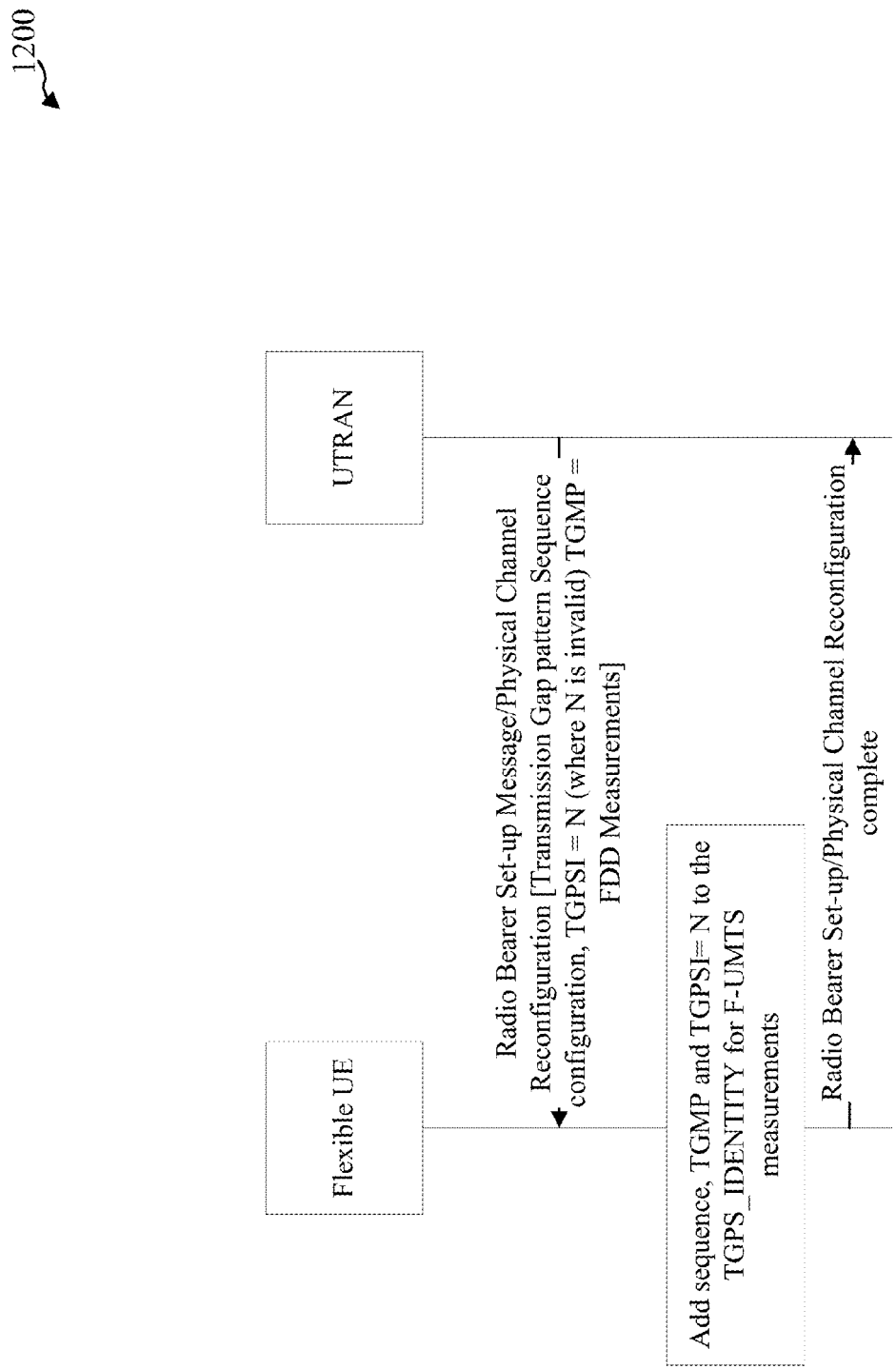
FIG. 12 shows a call flow for flexible bandwidth capable UE in accordance with various embodiments.

Some embodiments may modify the RAN (e.g., UTRAN) and/or flexible bandwidth capable UEs to allow transmission gap pattern sequence identifier (TGPSI) that is not in the range 1<TGPSI<maxTGPS (e.g., X>maxTGPS). Some embodiments may send compressed mode configurations and measurement activation with invalid TGSI. Legacy UEs may send a failure message to the network with a failure cause—protocol error. Reaction to receiving a measurement for an unidentified sequence may be no change to the existing measurement. A flexible bandwidth capable UE may see both configuration and measurement messages as valid. Some embodiments may involve changing the range of a parameter, such as the TGPSI. Legacy UEs may not measure flexible bandwidth (e.g., F-UMTS) cells since the TGPSI is deemed in error. FIG. 11 shows a legacy UE call flow 1100 in accordance with various embodiments. FIG. 12 shows a flexible bandwidth capable UE call flow 1200 in accordance with various embodiments.

Some embodiments may provide measurements for normal bandwidth cells (e.g., UMTS) and flexible bandwidth cells (e.g., F-UMTS) in a time-shared fashion. The UE 115 may use a configuration for normal/flexible bandwidth cell measurement. Once the measurement is completed, the network may deactivate the configuration of the UE 115, and may then configure and activate the compressed mode configurations and measurements for the next cell (either the normal/flexible bandwidth cells). No new interpretation may be needed by the RAN (e.g., UTRAN) and UE. There may or may not be a need for optimization of the compressed mode settings for both flexible bandwidth (e.g., F-UMTS) and normal bandwidth carrier system (e.g., UMTS). Both legacy and flexible bandwidth capable UEs may search for flexible bandwidth carrier system frequencies (e.g., F-UMTS frequencies). Performance (e.g., throughput) degradation may involve the UE observing multiple compressed gaps for normal bandwidth carrier system (e.g., UMTS) and/or flexible bandwidth carrier system (e.g., F-UMTS) measurement purposes. Time restrictions on when a normal bandwidth carrier system (e.g., UMTS) compressed mode measurements can be taken.

Figure 13:
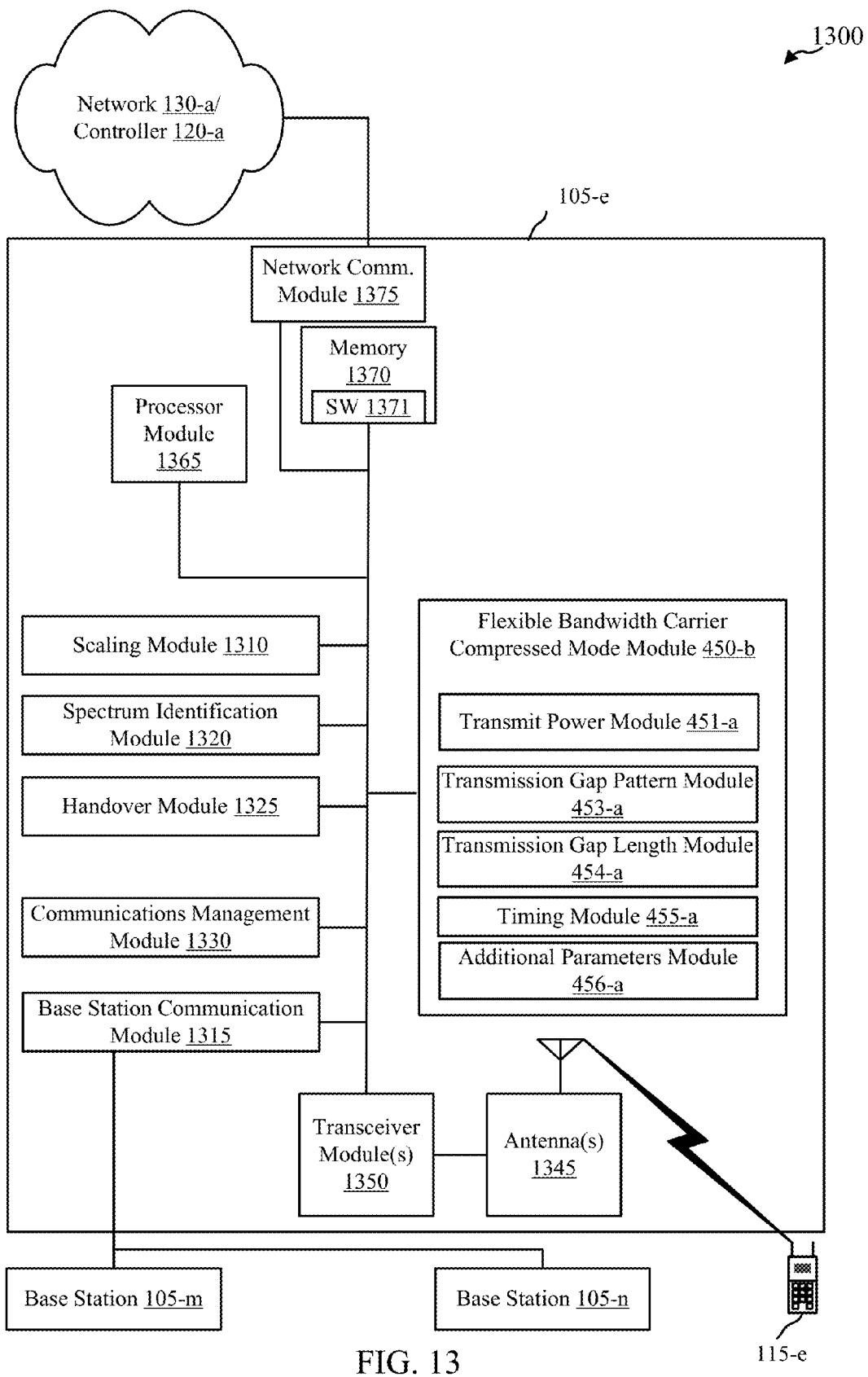
FIG. 13 shows a block diagram of a wireless communications system in accordance with various embodiments.

FIG. 13 shows a block diagram of a communications system 1300 in accordance with various embodiments. This system 1300 may be an example of aspects of the system 100 depicted in FIG. 1, systems 200-a and 200-b of FIGS. 2A and 2B, system 300 of FIG. 3, and/or system 1500 of FIG. 15. The base station 105-e may include antennas 1345, a transceiver module 1350, memory 1370, and a processor module 1365, which each may be in communication, directly or indirectly, with each other (e.g., over one or more buses). The transceiver module 1350 may be configured to communicate bi-directionally, via the antennas 1345, with the user equipment 115-e, which may be a multi-mode user equipment. The transceiver module 1350 (and/or other components of the base station 105-e) may also be configured to communicate bi-directionally with one or more networks. In some cases, the base station 105-e may communicate with the network 130-a and/or controller 120-a through network communications module 1375. Base station 105-e may be an example of an eNodeB base station, a Home eNodeB base station, a NodeB base station, and/or a Home NodeB base station. Controller 120-a may be integrated into base station 105-e in some cases, such as with an eNodeB base station.

Base station 105-e may also communicate with other base stations 105, such as base station 105-m and base station 105-n. Each of the base stations 105 may communicate with user equipment 115-e using different wireless communications technologies, such as different Radio Access Technologies. In some cases, base station 105-e may communicate with other base stations such as 105-m and/or 105-n utilizing base station communication module 1315. In some embodiments, base station communication module 1315 may provide an X2 interface within an LTE wireless communication technology to provide communication between some of the base stations 105. In some embodiments, base station 105-e may communicate with other base stations through controller 120-a and/or network 130-a.

The memory 1370 may include random access memory (RAM) and read-only memory (ROM). The memory 1370 may also store computer-readable, computer-executable software code 1371 containing instructions that are configured to, when executed, cause the processor module 1365 to perform various functions described herein (e.g., call processing, database management, message routing, etc.). Alternatively, the software code 1371 may not be directly executable by the processor module 1365 but be configured to cause the computer, e.g., when compiled and executed, to perform functions described herein.

The processor module 1365 may include an intelligent hardware device, e.g., a central processing unit (CPU) such as those made by Intel® Corporation or AMD®, a microcontroller, an application-specific integrated circuit (ASIC), etc. The processor module 1365 may include a speech encoder (not shown) configured to receive audio via a microphone, convert the audio into packets (e.g., 30 ms in length) representative of the received audio, provide the audio packets to the transceiver module 1350, and provide indications of whether a user is speaking. Alternatively, an encoder may only provide packets to the transceiver module 1350, with the provision or withholding/suppression of the packet itself providing the indication of whether a user is speaking.

The transceiver module 1350 may include a modem configured to modulate the packets and provide the modulated packets to the antennas 1345 for transmission, and to demodulate packets received from the antennas 1345. While some examples of the base station 105-e may include a single antenna 1345, the base station 105-e preferably includes multiple antennas 1345 for multiple links which may support carrier aggregation. For example, one or more links may be used to support macro communications with user equipment 115-e.

According to the architecture of FIG. 13, the base station 105-e may further include a communications management module 1330. The communications management module 1330 may manage communications with other base stations 105. By way of example, the communications management module 1330 may be a component of the base station 105-e in communication with some or all of the other components of the base station 105-e via a bus. Alternatively, functionality of the communications management module 1330 may be implemented as a component of the transceiver module 1350, as a computer program product, and/or as one or more controller elements of the processor module 1365.

The components for base station 105-*e* may be configured to implement aspects discussed above with respect to devices 430 and 435 in FIGS. 4C and 4D and may not be repeated here for the sake of brevity. For example, the flexible bandwidth carrier compressed mode module 450-*b* may be an example of the flexible bandwidth carrier compressed mode modules 450 and 450-*a* of FIGS. 4C and 4D. In this regard, the transmit power module 451-*a*, the transmission gap pattern module 453-*a*, the transmission gap length module 454-*a*, the timing module 455-*a*, and/or the additional parameters module 456-*a* of the flexible bandwidth carrier compressed mode module 450-*b* may be examples of the corresponding modules shown in FIG. 4D.

The base station 105-*e* may also include a spectrum identification module 1320. The spectrum identification module 1320 may be utilized to identify spectrum available for flexible waveforms. In some embodiments, a handover module 1325 may be utilized to perform handover procedures of the user equipment 115-*e* from one base station 105 to another. For example, the handover module 1325 may perform a handover procedure of the user equipment 115-*e* from base station 105-*e* to another where normal waveforms are utilized between the user equipment 115-*e* and one of the base stations and flexible waveforms are utilized between the user equipment and another base station. A scaling module 1310 may be utilized to scale and/or alter chip rates to generate flexible waveforms.

In some embodiments, the transceiver module 1350 in conjunction with antennas 1345, along with other possible components of base station 105-*e*, may transmit information regarding flexible waveforms and/or bandwidth scaling factors from the base station 105-*e* to the user equipment 115-*e*, to other base stations 105-*m*/105-*n*, or core network 130-*a*. In some embodiments, the transceiver module 1350 in conjunction with antennas 1345, along with other possible components of base station 105-*e*, may transmit information to the user equipment 115-*e*, to other base stations 105-*m*/105-*n*, or core network 130-*a*, such as flexible waveforms and/or bandwidth scaling factors, such that these devices or systems may utilize flexible waveforms. Moreover, in some embodiments, the transceiver module 1350 in conjunction with antennas 1345, along with other possible components of base station 105-*e*, may transmit information to the user equipment 115-*e*, to other base stations 105-*m*/105-*n*, or core network 130-*a*, such as one or more parameters identified to facilitate the inter-frequency measurements for flexible bandwidth carrier systems and/or for normal bandwidth carrier systems.

Figure 14:
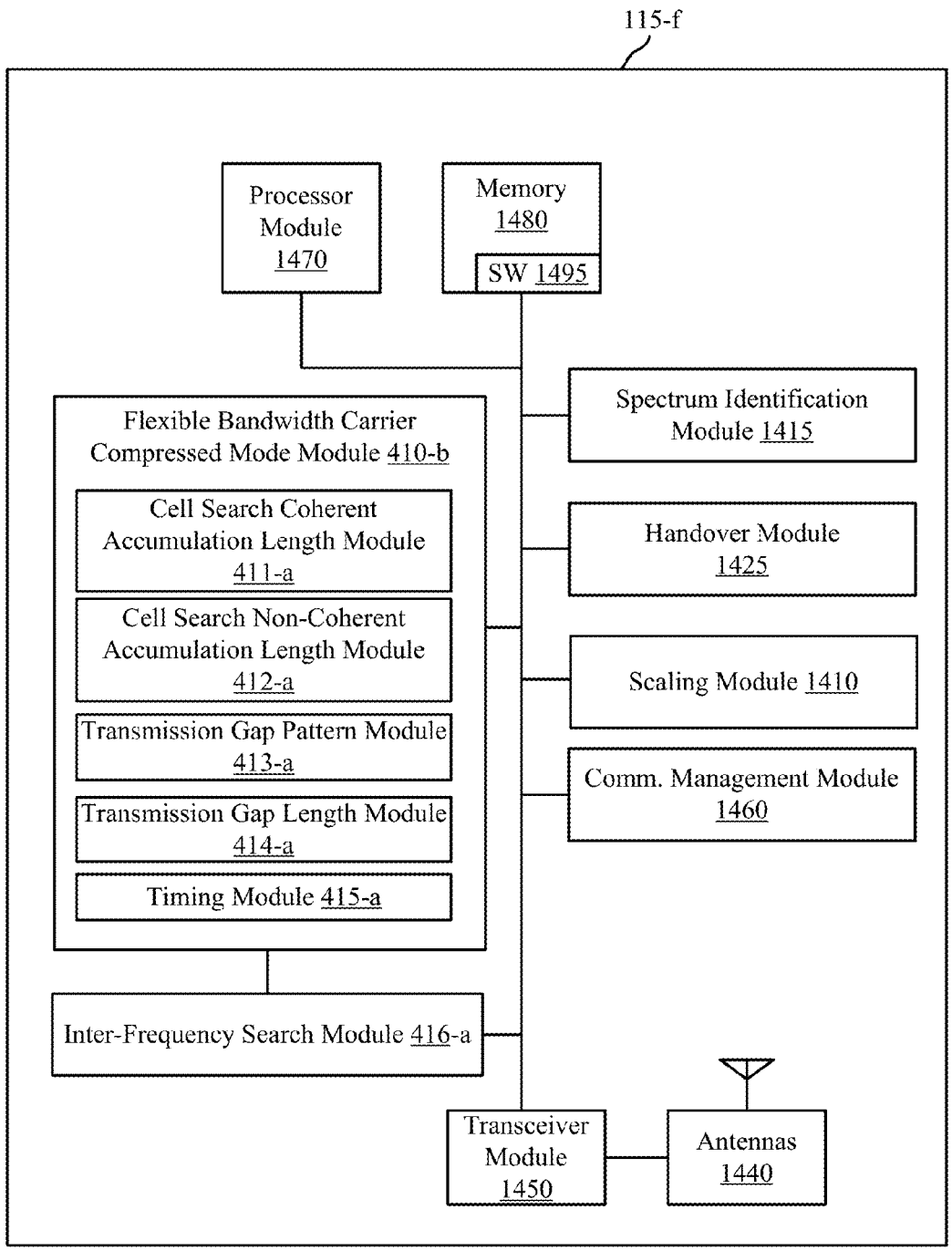
FIG. 14 shows a block diagram of a user equipment in accordance with various embodiments.

FIG. 14 is a block diagram 1400 of a user equipment 115-*f* configured for inter-frequency measurements for flexible bandwidth carrier systems in accordance with various embodiments. The user equipment 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-*f* may have an internal power supply (not shown), such as a small battery, to facilitate mobile operation. In some embodiments, the user equipment 115-*f* may be the user equipment 115 of FIG. 1, FIGS. 2A and 2B, FIG. 3, FIG. 13, and/or FIG. 15, and/or the devices 400 and 425 of FIGS. 4A and 4B. The user equipment 115-*f* may be a multi-mode user equipment. The user equipment-f may be referred to as a wireless communications device or a user equipment in some cases.

The user equipment 115-*f* may include antennas 1440, a transceiver module 1450, memory 1480, and a processor module 1470, which each may be in communication, directly or indirectly, with each other (e.g., via one or more buses). The transceiver module 1450 may be configured to communicate bi-directionally, via the antennas 1440 and/or one or more wired or wireless links, with one or more networks, as described above. For example, the transceiver module 1450 may be configured to communicate bi-directionally with base stations 105 of FIG. 1, FIGS. 2A and 2B, FIG. 3, FIG. 13, and/or FIG. 15. The transceiver module 1450 may include a modem configured to modulate the packets and provide the modulated packets to the antennas 1440 for transmission, and to demodulate packets received from the antennas 1440. While the user equipment 115-*f* may include a single antenna, the user equipment 115-*f* will typically include multiple antennas 1440 for multiple links.

The memory 1480 may include random access memory (RAM) and read-only memory (ROM). The memory 1480 may store computer-readable, computer-executable software code 1495 containing instructions that are configured to, when executed, cause the processor module 1470 to perform various functions described herein (e.g., call processing, database management, message routing, etc.). Alternatively, the software code 1495 may not be directly executable by the processor module 1470 but be configured to cause the computer (e.g., when compiled and executed) to perform functions described herein.

The processor module 1470 may include an intelligent hardware device, e.g., a central processing unit (CPU) such as those made by Intel® Corporation or AMD®, a microcontroller, an application-specific integrated circuit (ASIC), etc. The processor module 1470 may include a speech encoder (not shown) configured to receive audio via a microphone, convert the audio into packets (e.g., 30 ms in length) representative of the received audio, provide the audio packets to the transceiver module 1450, and provide indications of whether a user is speaking. Alternatively, an encoder may only provide packets to the transceiver module 1450, with the provision or withholding/suppression of the packet itself providing the indication of whether a user is speaking.

According to the architecture of FIG. 14, the user equipment 115-*f* may further include a communications management module 1460. The communications management module 1460 may manage communications with other user equipment 115. By way of example, the communications management module 1460 may be a component of the user equipment 115-*f* in communication with some or all of the other components of the user equipment 115-*f* via a bus. Alternatively, functionality of the communications management module 1460 may be implemented as a component of the transceiver module 1450, as a computer program product, and/or as one or more controller elements of the processor module 1470.

The components for user equipment 115-*f* may be configured to implement aspects discussed above with respect to devices 400 and 425 of FIGS. 4A and 4B, and may not be repeated here for the sake of brevity. For example, the flexible bandwidth carrier compressed mode module 410-*b* may be an example of the flexible bandwidth carrier compressed mode modules 410 and 410-*a* of FIGS. 4A and 4B. In this regard, the cell search coherent accumulation length module 411-*a*, the cell search non-coherent accumulation length module 412-*a*, the transmission gap pattern module 413-*a*, the transmission gap length module 414-*a*, and/or the timing module 415-*a* of the flexible bandwidth carrier compressed mode module 410-*b* may be examples of the corresponding modules shown in FIG. 4B. The inter-frequency search module 416-*a* may be an example of the inter-frequency search module 416 of FIGS. 4A and 4B.

The user equipment 115-f may also include a spectrum identification module 1415. The spectrum identification module 1415 may be utilized to identify spectrum available for flexible waveforms. In some embodiments, a handover module 1425 may be utilized to perform handover procedures of the user equipment 115-f from one base station to another. For example, the handover module 1425 may perform a handover procedure of the user equipment 115-f from one base station to another where normal waveforms are utilized between the user equipment 115-f and one of the base stations and flexible waveforms are utilized between the user equipment and another base station. A scaling module 140 may be utilized to scale and/or alter chip rates to generate flexible waveforms.

In some embodiments, the transceiver module 1450 in conjunction with antennas 1440, along with other possible components of user equipment 115-f, may transmit information regarding flexible waveforms and/or bandwidth scaling factors from the user equipment 115-f to base stations or a core network. In some embodiments, the transceiver module 1450, in conjunction with antennas 1440 along with other possible components of user equipment 115-f, may transmit information, such as flexible waveforms and/or bandwidth scaling factors, to base stations or a core network such that these devices or systems may utilize flexible waveforms. Moreover, in some embodiments, the transceiver module 1450 in conjunction with antennas 1440, along with other possible components of user equipment 115-f, may receive information that may be used to identify one or more parameters to facilitate the inter-frequency measurements for flexible bandwidth carrier systems and/or for normal bandwidth carrier systems.

Figure 15:
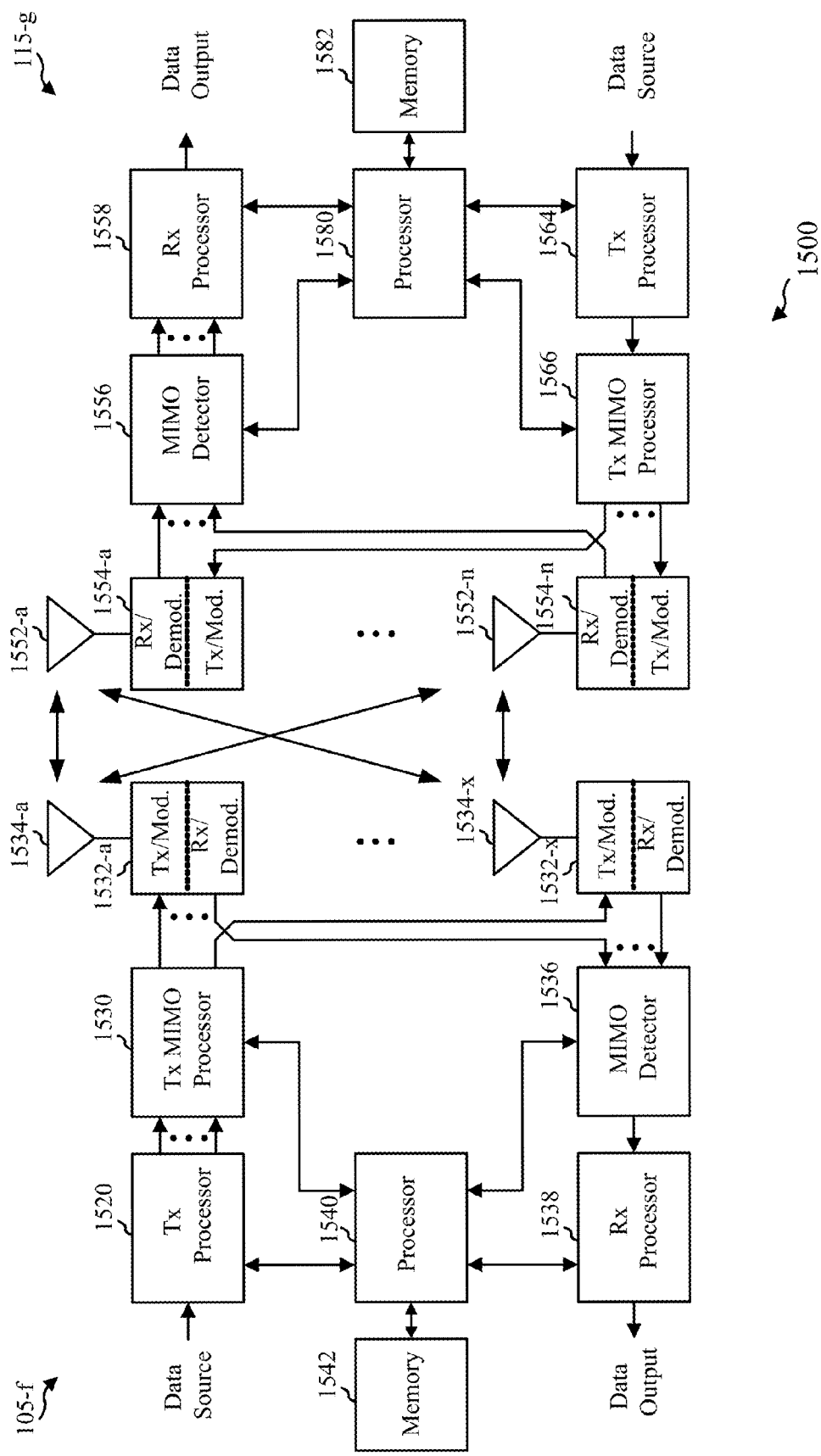
FIG. 15 shows a block diagram of a wireless communications system that includes a base station and a user equipment in accordance with various embodiments.

FIG. 15 is a block diagram of a system 1500 including a base station 105-f and a user equipment 115-g in accordance with various embodiments. This system 1500 may be an example of the system 100 of FIG. 1, systems 200-a and 200-b of FIGS. 2A and 2B, system 300 of FIG. 3, and/or system 1100 of FIG. 11. The base station 105-f may be equipped with antennas 1534-a through 1534-x, and the user equipment 115-g may be equipped with antennas 1552-a through 1552-n. At the base station 105-f, a transmitter processor 1520 may receive data from a data source.

The transmitter processor 1520 may process the data. The transmitter processor 1520 may also generate reference symbols, and a cell-specific reference signal. A transmit (TX) MIMO processor 1530 may perform spatial processing (e.g., precoding) on data symbols, control symbols, and/or reference symbols, if applicable, and may provide output symbol streams to the transmit modulators 1532-a through 1532-x. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink (DL) signal. In one example, DL signals from modulators 1532-a through 1532-x may be transmitted via the antennas 1534-a through 1534-x, respectively. The transmitter processor 1520 may receive information from a processor 1540. The processor 1540 may be configured to generate flexible waveforms through altering a chip rate and/or utilizing a bandwidth scaling factor; this may be done dynamically in some cases. The processor 1540 may also provide for different alignment and/or offsetting procedures. The processor 1540 may also utilize scaling and/or chip rate information to perform measurements on the other subsystems, perform handoffs to the other subsystems, perform reselection, etc. The processor 1540 may invert the effects of time stretching associated with the use of flexible bandwidth through parameter scaling. In some embodiments, the processor 1540 may be implemented as part of a general processor, the transmitter processor 1520, and/or the receiver processor 1538. The processor 1540 may be coupled with a memory 1542.

In some embodiments, processor 1540 and/or Tx processor 1520 may be configured for inter-frequency measurements for flexible bandwidth carrier systems. For example, processor 1540 may be configured for identifying one or more parameters to facilitate inter-frequency searches with respect to two or more different bandwidth carriers. The two or more different bandwidth carriers may include one or more flexible bandwidth cells and one or more normal bandwidth cells. The one or more identified parameters may include compressed mode parameters, search parameters, and/or timing information. The one or more identified parameters may be transmitted to one or more user equipment 115-g through Tx processor 1520 to facilitate the inter-frequency measurements with respect to the one or more flexible bandwidth cells and/or normal bandwidth cells.

At the user equipment 115-g, the user equipment antennas 1552-a through 1552-n may receive the DL signals from the base station 105-f and may provide the received signals to the demodulators 1554-a through 1554-n, respectively. Each demodulator 1554 may condition (e.g., filter, amplify, downconvert, and digitize) a respective received signal to obtain input samples. Each demodulator 1554 may further process the input samples (e.g., for OFDM, etc.) to obtain received symbols. A MIMO detector 1556 may obtain received symbols from all the demodulators 1554-a through 1554-n, perform MIMO detection on the received symbols if applicable, and provide detected symbols. A receive processor 1558 may process (e.g., demodulate, deinterleave, and decode) the detected symbols, providing decoded data for the user equipment 115-g to a data output, and provide decoded control information to a processor 1580, or memory 1582.

On the uplink (UL), at the user equipment 115-g, a transmitter processor 1564 may receive and process data from a data source. The transmitter processor 1564 may also generate reference symbols for a reference signal. The symbols from the transmitter processor 1564 may be precoded by a transmit MIMO processor 1566 if applicable, further processed by the demodulators 1554-a through 1554-n (e.g., for SC-FDMA, etc.), and be transmitted to the base station 105-f in accordance with the transmission parameters received from the base station 105-f. The transmitter processor 1564 may also be configured to generate flexible waveforms through altering a chip rate and/or utilizing a bandwidth scaling factor; this may be done dynamically in some cases. The transmitter processor 1564 may receive information from processor 1580. The processor 1580 may provide for different alignment and/or offsetting procedures. The processor 1580 may also utilize scaling and/or chip rate information to perform measurements on the other subsystems, perform handoffs to the other subsystems, perform reselection, etc. The processor 1580 may invert the effects of time stretching associated with the use of flexible bandwidth through parameter scaling. At the base station 105-f, the UL signals from the user equipment 115-g may be received by the antennas 1534, processed by the demodulators 1532, detected by a MIMO detector 1536 if applicable, and further processed by a receive processor. The receive processor 1538 may provide decoded data to a data output and to the processor 1580. In some embodiments, the processor 1580 may be implemented as part of a general processor, the transmitter processor 1564, and/or the receiver processor 1558.

In some embodiments, processor 1580 and/or RX processor 1558 may be configured for receiving one or more identified parameters or for identifying one or more parameters to facilitate inter-frequency searches with respect to two or more different bandwidth carriers. The two or more bandwidth carriers may include one or more flexible bandwidth cells and one or more normal bandwidth cells. In some cases, the processor 1580 may identify the one or more modified search parameters by increasing or reducing parameters typically used for normal bandwidth cells. The identification may include determining the parameters from data stored in the memory 1582 and/or by selecting the parameters from a set of parameters stored in the memory 1582. The one or more identified parameters, which may include compressed mode parameters, timing information, and/or search parameters, may be utilized to perform by the processor 1580 one or more inter-frequency measurements with respect to the one or more flexible bandwidth cells and/or normal bandwidth cells.

Figure 16A:
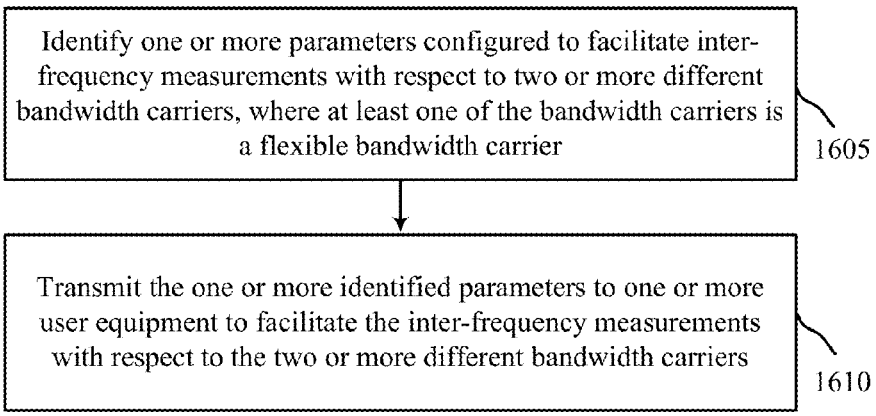
FIG. 16A shows a flow diagram of a method used by some base stations for providing inter-frequency measurements for flexible bandwidth carrier systems in accordance with various embodiments.

Turning to FIG. 16A, a flow diagram is shown of a method 1600 for inter-frequency measurements for flexible bandwidth carrier systems in accordance with various embodiments. Method 1600 may be implemented utilizing various wireless communications devices including, but not limited to: a base station 105 as seen in FIG. 1, FIGS. 2A and 2B, FIG. 3, FIG. 13, and/or FIG. 15; a device 430 as seen in FIG. 4C; and/or a device 435 as seen in FIG. 4D. In some embodiments, the base station 105 includes the controller 120. In some embodiments, method 1600 may be implemented utilizing various wireless communications devices including, but not limited to: a core network 130 and/or controller 120 as seen in FIG. 1, and/or a core network 130-*a* and/or a controller 120-*a* as seen in FIG. 13.

At block 1605, one or more parameters may be identified that are configured to facilitate inter-frequency measurements for the UE on a carrier with a higher bandwidth and making inter-frequency measurements on a lower bandwidth cell with respect to two or more different bandwidth carriers, where at least one of the bandwidth carriers is a flexible bandwidth carrier. The one or more identified parameters may include compressed mode parameters and/or timing information. The compressed mode parameters and/or timing information signaled by a network may be used to determine search parameters. At block 1610, the one or more identified parameters may be transmitted to one or more user equipment to facilitate the inter-frequency measurements with respect to two or more different bandwidth carriers. In some embodiments, timing information may also be transmitted to the one or more user equipment along with the one or more identified parameters or as part of the one or more identified parameters.

In some embodiments of method 1600, identifying the one or more parameters may include at least one of the following aspects to facilitate the inter-frequency measurements with respect to two or more different bandwidth carriers where at least one of the bandwidth carriers is a flexible bandwidth carrier: reducing one or more cell search coherent accumulation lengths; reducing one or more cell search non-coherent accumulation lengths; increasing an amount of repetition of a transmission gap pattern; increasing a length of a transmission gap; or reducing a window size.

In some embodiments of method 1600, the one or more parameters may include at least one or more compressed mode parameters or timing information. In some cases, one of the bandwidth carriers, the serving cell, may be a normal bandwidth carrier with a larger bandwidth than the flexible bandwidth inter-frequency neighboring cell.

In some embodiments of method 1600, separate parameters of the one or more identified parameters may be utilized to facilitate the inter-frequency measurements with respect to the two or more different bandwidth carriers. In other embodiments, the same one or more parameters of the one or more identified parameters may be utilized to facilitate the inter-frequency measurements with respect to the two or more different bandwidth carriers. That is, the same one or more parameters of the one or more identified parameters may be utilized to facilitate the inter-frequency measurements with respect to a normal bandwidth carrier and with respect to the at least one of the bandwidth carriers that is a flexible bandwidth carrier. In the case both cells are flexible bandwidth cells, the same one or more parameters of the one or more identified parameters may be utilized to facilitate the inter-frequency measurements with respect to the flexible bandwidth cell with larger bandwidth and the flexible bandwidth cell with smaller bandwidth.

Some embodiments of method 1600 include a UE creating compressed gap configurations, which may be optimized for flexible bandwidth carrier system corresponding to compressed gap configurations for normal bandwidth carrier system. Some embodiments include a UE storing compressed gap configurations, which may be optimized for flexible bandwidth carrier system corresponding to compressed gap configurations for a normal bandwidth carrier system. Some embodiments include a UE mapping compressed gap configurations transmitted by base stations for searching normal cells to compressed gap configurations, which may be optimized for flexible bandwidth cells and stored in the UE.

In some embodiments of method 1600, identifying the one or more parameters may include determining the one or more parameters when the one or more parameters are stored on a storage medium in a communication device (e.g., base station).

Figure 16B:
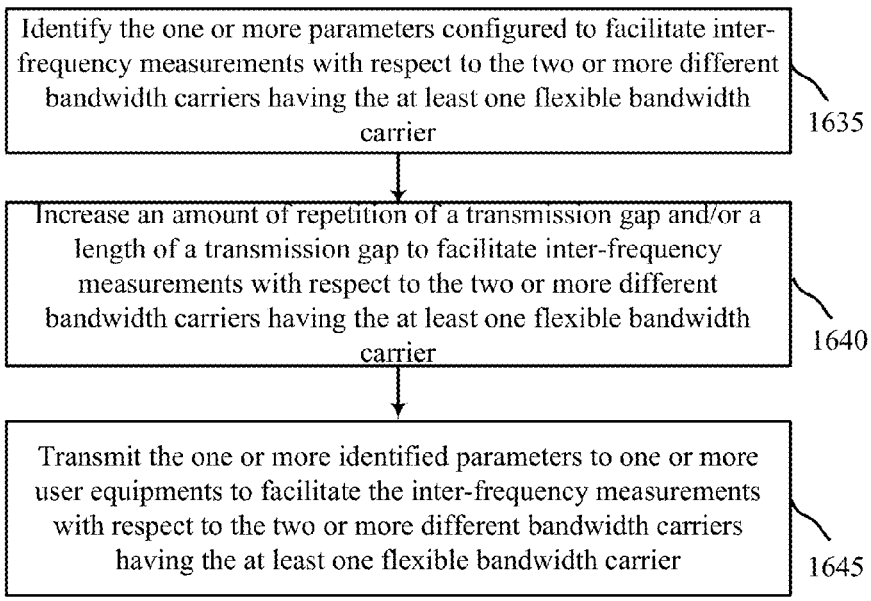
FIG. 16B shows a flow diagram of another method used by some base stations for providing inter-frequency measurements for flexible bandwidth carrier systems in accordance with various embodiments.

Turning to FIG. 16B, a flow diagram is shown of a method 1620 for inter-frequency measurements for flexible bandwidth carrier systems in accordance with various embodiments. Method 1620, like method 1600 above, may be implemented utilizing various wireless communications devices including, but not limited to: a base station 105 as seen in FIG. 1, FIGS. 2A and 2B, FIG. 3, FIG. 13, and/or FIG. 15; a device 430 as seen in FIG. 4C; and/or a device 435 as seen in FIG. 4D. In some embodiments, method 1620 may be implemented utilizing various wireless communications devices including, but not limited to: a core network 130 and/or controller 120 as seen in FIG. 1, and/or a core network 130-*a* and/or a controller 120-*a* as seen in FIG. 13. Method 1620 may include one or more aspects of method 1600 of FIG. 16A.

At block 1635, one or more parameters may be identified that are configured to facilitate inter-frequency searches with respect to the two or more different bandwidth carriers having the at least one flexible bandwidth carrier. At block 1640, to facilitate inter-frequency measurements with respect to the two or more different bandwidth carriers having at least one flexible bandwidth carrier, an amount of repetition of a transmission gap may be modified and/or a length of a transmission gap may be modified.

At block 1645, the one or more identified parameters may be transmitted to one or more user equipment to facilitate the inter-frequency measurements with respect to the two or more different bandwidth carriers having the at least one flexible bandwidth carrier. In some embodiments, timing information may also be transmitted to the one or more user equipment along with the one or more identified parameters or as part of the one or more identified parameters.

Figure 16C:
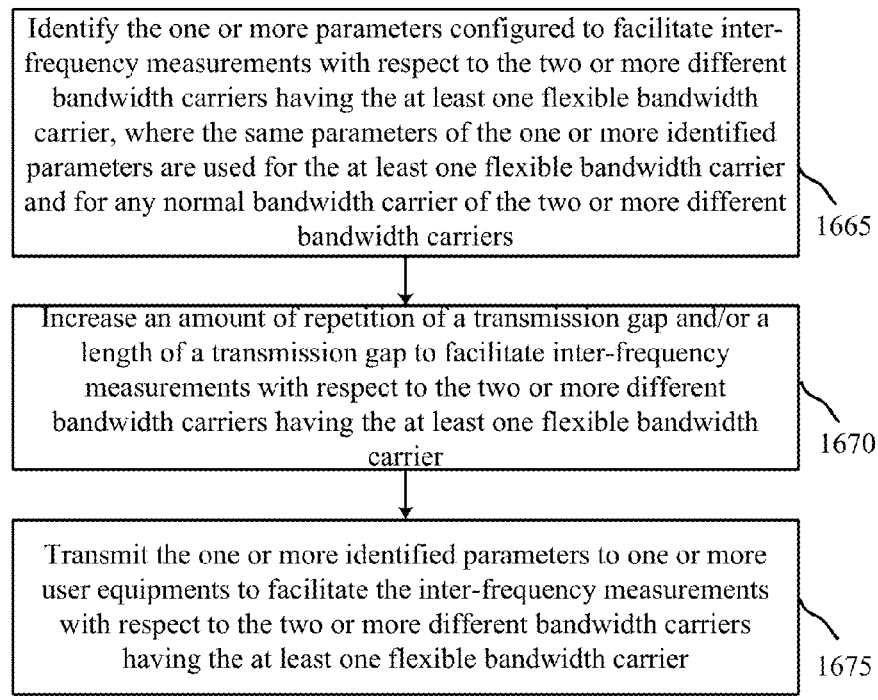
FIG. 16C shows a flow diagram of yet another method used by some base stations for providing inter-frequency measurements for flexible bandwidth carrier systems in accordance with various embodiments.

Turning to FIG. 16C, a flow diagram is shown of a method 1650 for inter-frequency measurements for flexible bandwidth carrier systems in accordance with various embodiments. Method 1650, like methods 1600 and 1620 above, may be implemented utilizing various wireless communications devices including, but not limited to: a base station 105 as seen in FIG. 1, FIGS. 2A and 2B, FIG. 3, FIG. 13, and/or FIG. 15; a device 430 as seen in FIG. 4C; and/or a device 435 as seen in FIG. 4D. In some embodiments, method 1650 may be implemented utilizing various wireless communications devices including, but not limited to: a core network 130 and/or controller 120 as seen in FIG. 1, and/or a core network 130-*a* and/or a controller 120-*a* as seen in FIG. 13. Method 1650 may include one or more aspects of method 1600 of FIG. 16A.

To facilitate inter-frequency measurements with respect to two or more different bandwidth carriers having at least one flexible bandwidth carrier, one or more cell search coherent accumulation lengths may be reduced, one or more non-coherent accumulation lengths may be reduced, and/or a window size may be reduced. At block 1665, one or more parameters may be identified that are configured to facilitate inter-frequency searches with respect to the two or more different bandwidth carriers having the at least one flexible bandwidth carrier. At block 1670, to facilitate inter-frequency measurements with respect to the two or more different bandwidth carriers having at least one flexible bandwidth carrier, an amount of repetition of a transmission gap may be increased and/or a length of a transmission gap may be increased.

Moreover, the same parameters of the one or more identified parameters may be use for the at least one flexible bandwidth carrier and for any normal bandwidth carrier of the two or more different bandwidth carriers or two flexible bandwidth carriers with different bandwidths. At block 1675, the one or more identified parameters may be transmitted to one or more user equipment to facilitate the inter-frequency measurements with respect to the two or more different bandwidth carriers having the at least one flexible bandwidth carrier. In some embodiments, timing information may also be transmitted to the one or more user equipment along with the one or more identified parameters or as part of the one or more identified parameters.

Figure 17A:
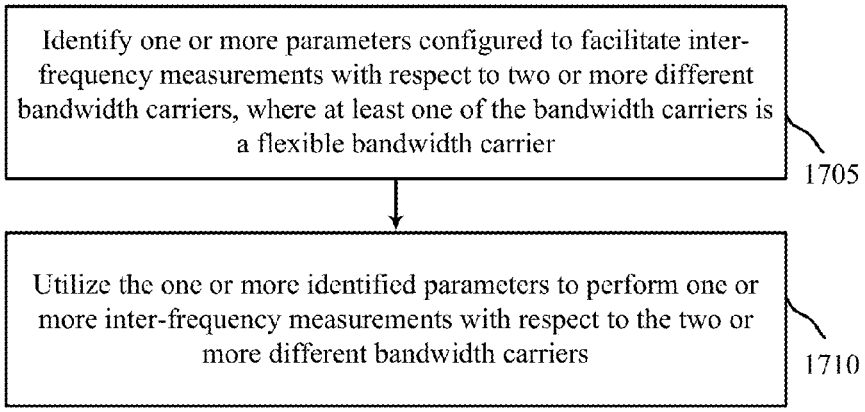
FIG. 17A shows a flow diagram of a method used by some user equipment for providing inter-frequency measurements for flexible bandwidth carrier systems in accordance with various embodiments.

Turning to FIG. 17A, a flow diagram is shown of a method 1700 for inter-frequency measurements for flexible bandwidth carrier systems in accordance with various embodiments. In some embodiments, method 1700 may be implemented utilizing various wireless communications devices including, but not limited to: a user equipment 115 as seen in FIG. 1, FIGS. 2A and 2B, FIG. 3, FIG. 13, FIG. 14, and/or FIG. 15; a device 400 as seen in FIG. 4A; and/or a device 425 as seen in FIG. 4B.

At block 1705, one or more parameters may be identified, at a user equipment, that are configured to facilitate inter-frequency searches with respect to two or more different bandwidth carriers, where at least one of the bandwidth carriers is a flexible bandwidth carrier. A UE may receive the compressed mode parameters and timing information and may determine the search parameters based on the information received from the network, on the scaling factor, and/or the bandwidth of the cell where it is taking inter-frequency measurements. At block 1710, the one or more identified parameters may be utilized to perform inter-frequency measurements with respect to the two or more different bandwidth carriers. In some embodiments, timing information may also be utilized with the one or more identified parameters to perform the inter-frequency measurements. As noted above, the timing information may be part of the one or more identified parameters.

In some embodiments of method 1700, identifying the one or more parameters may include at least one of the following aspects to facilitate the inter-frequency measurements with respect to two or more different bandwidth carriers where at least one of the bandwidth carriers is a flexible bandwidth carrier: reducing one or more cell search coherent accumulation lengths; reducing one or more non-coherent accumulation lengths; modifying an amount of repetition of a transmission gap pattern; modifying a length of a transmission gap; or reducing a window size. The UE may receive these parameters and timing information from the network. Typically, the UE may determine to adjust the coherent length, non-coherent length, and the window size based on, for example, the compressed mode parameters received from the network and the neighboring cell's scaling factor.

In some embodiments of method 1700, the one or more parameters may include at least one or more compressed mode parameters, timing information, or search parameters. Moreover, the inter-frequency measurements may be performed when in a connected mode. In some embodiments, one of the two or more different bandwidth carriers may be a normal bandwidth carrier. In other cases, both cells may flexible bandwidth cells, the serving cell maybe a flexible bandwidth cell with a larger bandwidth higher than the flexible bandwidth inter-frequency neighboring cell.

In some embodiments of method 1700, separate parameters of the one or more identified parameters may be utilized to facilitate the inter-frequency measurements with respect to the two or more different bandwidth carriers. These separate parameters may be configured to be utilized concurrently or at separate times. When separate parameters are used, an invalid transmission gap pattern identifier may be utilized to facilitate the inter-frequency searches with respect to the two or more different bandwidth carriers. Moreover, the invalid transmission gap pattern identifier may be used to indicate the flexible bandwidth parameters and based on the reaction of the UE to the invalid transmission gap pattern identifier, the network may identify legacy user equipment. In other embodiments, the same one or more parameters of the one or more identified parameters may be utilized to facilitate the inter-frequency measurements with respect to the two or more different bandwidth carriers. That is, the same parameters of the one or more identified parameters may be utilized to facilitate the inter-frequency measurements with respect to a normal bandwidth carrier and also with respect to the at least one of the bandwidth carriers that is a flexible bandwidth carrier. In the case both cells are flexible bandwidth cells, the same one or more parameters of the one or more identified parameters may be utilized to facilitate the inter-frequency measurements with respect to the flexible bandwidth cell with larger bandwidth and the flexible bandwidth cell with smaller bandwidth.

In some embodiments of method 1700, identifying the one more parameters may include receiving the one or more parameters after transmission from a base station and/or determining the one or more parameters when the one or more parameters are stored on a storage medium in a communication device (e.g., UE). Some embodiments may also have a time source (e.g., clock) running at a dilated time when performing inter-frequency measurements with respect to at least one of the one or more flexible bandwidth carriers and/or the one or more normal bandwidth carriers.

Figure 17B:
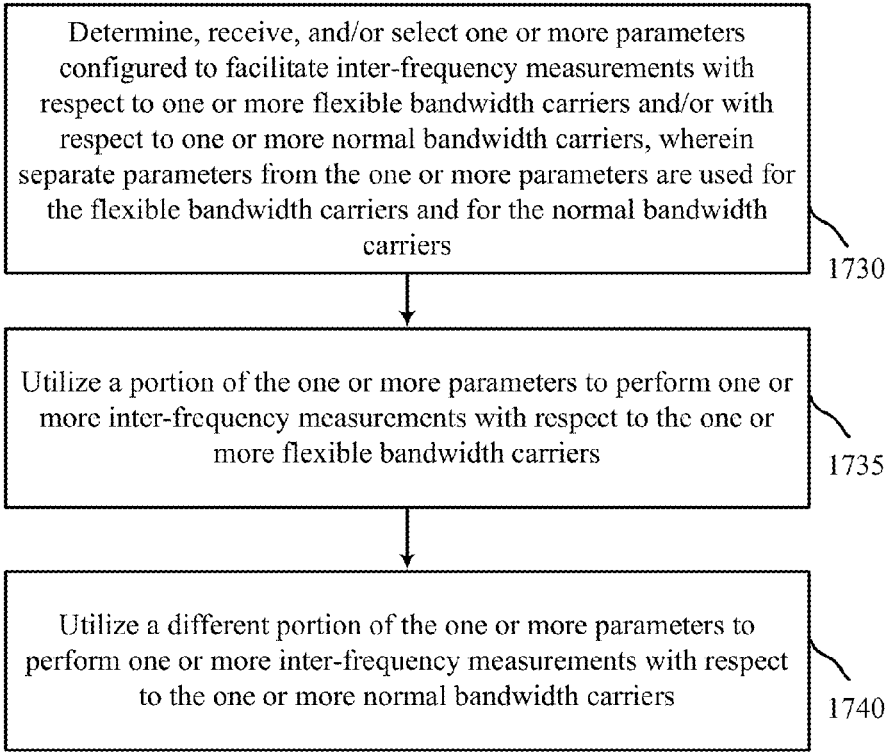
FIG. 17B shows a flow diagram of another method used by some user equipment for providing inter-frequency measurements for flexible bandwidth carrier systems in accordance with various embodiments.

Turning to FIG. 17B, a flow diagram is shown of a method 1720 for inter-frequency measurements for flexible bandwidth carrier systems in accordance with various embodiments. Method 1720, like method 1700 above, may be implemented utilizing various wireless communications devices including, but not limited to: a user equipment 115 as seen in FIG. 1, FIGS. 2A and 2B, FIG. 3, FIG. 13, FIG. 14, and/or FIG. 15; a device 400 as seen in FIG. 4A; and/or a device 425 as seen in FIG. 4B. Method 1720 may include one or more aspects of method 1700 of FIG. 17A.

At block 1720, one or more parameters may be determined, received, and/or selected, which may be configured to facilitate inter-frequency searches with respect to one or more flexible bandwidth carriers and/or with respect to one or more normal bandwidth carriers. The one or more parameters may include compressed mode parameters, search parameters, and/or timing information.

At block 1725, a portion of the one or more parameters may be utilized to perform one or more inter-frequency measurements with respect to the one or more flexible bandwidth carriers. At block 1730, a different portion of the one or more parameters may be utilized to perform one or more inter-frequency measurements with respect to the one or more normal bandwidths. In some embodiments, timing information may also be utilized with the one or more parameters to perform the inter-frequency measurements.

The method 1720 may also be applied to perform one or more inter-frequency measurements with respect to a first flexible bandwidth carrier and a second flexible bandwidth carrier. One of the flexible bandwidth carriers may have a larger bandwidth than the other flexible bandwidth carrier.

Figure 17C:
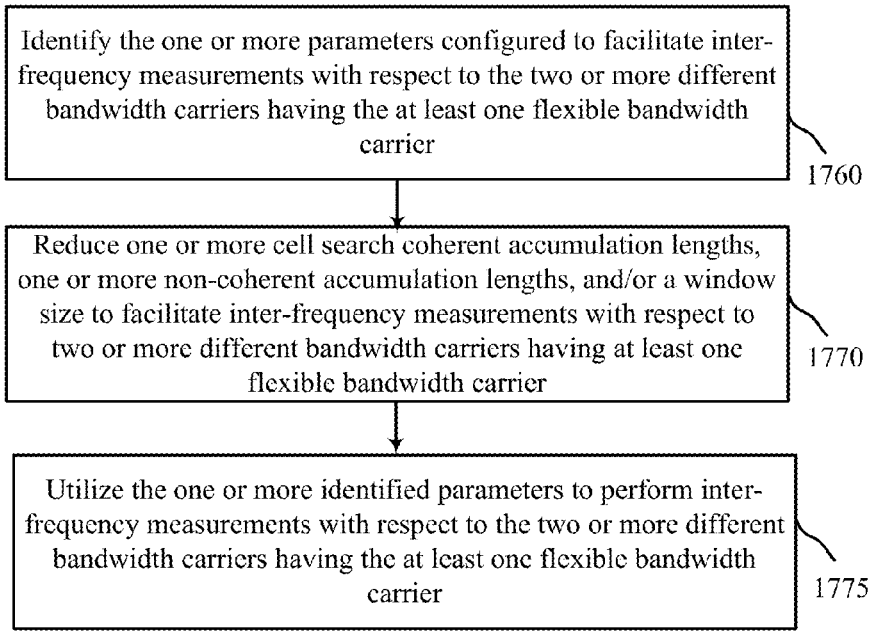
FIG. 17C shows a flow diagram of yet another method used by some user equipment for providing inter-frequency measurements for flexible bandwidth carrier systems in accordance with various embodiments.

Turning to FIG. 17C, a flow diagram is shown of a method 1750 for inter-frequency measurements for flexible bandwidth carrier systems in accordance with various embodiments. Method 1750, like methods 1700 and 1720 above, may be implemented utilizing various wireless communications devices including, but not limited to: a user equipment 115 as seen in FIG. 1, FIGS. 2A and 2B, FIG. 3, FIG. 13, FIG. 14, and/or FIG. 15; a device 400 as seen in FIG. 4A; and/or a device 425 as seen in FIG. 4B. Method 1750 may include one or more aspects of method 1700 of FIG. 17A.

At block 1760, one or more parameters may be identified that are configured to facilitate inter-frequency searches with respect to the two or more different bandwidth carriers having the at least one flexible bandwidth carrier. At block 1770, to facilitate inter-frequency measurements with respect to two or more different bandwidth carriers having at least one flexible bandwidth carrier, one or more cell search coherent accumulation lengths may be reduced, one or more cell search non-coherent accumulation lengths may be reduced, and/or a window size may be reduced. To facilitate inter-frequency measurements with respect to the two or more different bandwidth carriers having at least one flexible bandwidth carrier, an amount of repetition of a transmission gap may be increased and/or a length of a transmission gap may be increased.

At block 1775, the one or more identified parameters may be utilized to perform inter-frequency measurements with respect to the two or more different bandwidth carriers having the at least one flexible bandwidth carrier. In some embodiments, timing information may also be transmitted to the one or more user equipment along with the one or more identified parameters or as part of the one or more identified parameters.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques.

These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for inter-frequency measurements of flexible bandwidth carrier systems, comprising:
    identifying, at a user equipment, one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and
    utilizing the one or more identified parameters to perform one or more inter-frequency measurements with respect to the two or more different bandwidth carriers, wherein at least one of the one or more identified parameters is a same parameter utilized for each of the two or more different bandwidth carriers.

2. The method of claim 1, wherein identifying the one or more parameters comprises:
    reducing one or more cell search coherent accumulation lengths to facilitate the inter-frequency measurements with respect to the two or more different bandwidth carriers.

3. The method of claim 1, wherein identifying the one or more parameters comprises:
    reducing one or more cell search non-coherent accumulation lengths to facilitate the inter-frequency measurements with respect to the two or more different bandwidth carriers.

4. The method of claim 1, wherein identifying the one or more parameters comprises:
    receiving an increased amount of repetition of a transmission gap pattern to facilitate the inter-frequency measurements with respect to the two or more different bandwidth carriers.

5. The method of claim 1, wherein identifying the one or more parameters comprises:
    receiving an increased length of a transmission gap to facilitate the inter-frequency measurements with respect to the two or more different bandwidth carriers.

6. The method of claim 1, wherein identifying the one or more parameters comprises:
    reducing a window size to facilitate the inter-frequency measurements with respect to the two or more different bandwidth carriers.

7. The method of claim 1, wherein identifying the one or more parameters further comprises at least:
    creating, at the user equipment, one or more compressed gap configurations for a flexible bandwidth carrier system corresponding to one or more compressed gap configurations for a normal bandwidth carrier system.

8. The method of claim 1, wherein identifying the one or more parameters further comprises at least:
    storing, at the user equipment, one or more compressed gap configurations for a flexible bandwidth carrier system corresponding to one or more compressed gap configurations for a normal bandwidth carrier system.

9. The method of claim 1, wherein identifying the one or more parameters further comprises at least:
    mapping and storing, at the user equipment, one or more compressed gap configurations transmitted by a base station for searching normal cells to one or more other compressed gap configurations for one or more flexible bandwidth cells.

10. The method of claim 1, wherein the one or more parameters include at least one or more compressed mode parameters, timing information, or search parameters.

11. The method of claim 1, wherein at least one of the bandwidth carriers is a normal bandwidth carrier.

12. The method of claim 1, wherein at least one of the bandwidth carriers includes a flexible bandwidth carrier in a serving cell with a higher bandwidth than the flexible bandwidth carrier in a neighboring cell.

13. The method of claim 1, wherein the inter-frequency measurements are performed in a connected mode.

14. The method of claim 1, wherein utilizing the one or more identified parameters comprises:
    utilizing separate parameters of the one or more identified parameters to facilitate the inter-frequency measurements with respect to the two or more different bandwidth carriers.

15. The method of claim 14, wherein the separate parameters are configured to be utilized at a same time or at separate times.

16. The method of claim 14, further comprising:
    utilizing an invalid transmission gap pattern identifier to facilitate the inter-frequency measurements with respect to the two or more different bandwidth carriers.

17. The method of claim 16, further comprising:
    utilizing the invalid transmission gap pattern identifier to identify legacy user equipment.

18. The method of claim 1, wherein utilizing the one or more identified parameters comprises:
    utilizing the same one or more parameters of the one or more identified parameters to facilitate the inter-frequency measurements with respect to the two or more different bandwidth carriers.

19. The method of claim 1, wherein identifying the one or more parameters comprises:
    receiving the one or more parameters, wherein the one or more parameters are transmitted from a base station.

20. The method of claim 1, wherein identifying the one or more parameters comprises:
    determining the one or more parameters, wherein the one or more parameters are stored on a storage medium of the user equipment.

21. The method of claim 1, wherein utilizing the one or more parameters comprises:
    utilizing the same one or more parameters of the one or more identified parameters to facilitate the inter-frequency measurements with respect to a normal bandwidth carrier and with respect to the flexible bandwidth carrier.

22. The method of claim 1, further comprising:
    running a time source at a dilated time when performing the inter-frequency measurements with respect to at least one of the two or more different bandwidth carriers.

23. A wireless communications system comprising:
    means for identifying one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and means for utilizing the one or more identified parameters to perform one or more inter-frequency measurements with respect to the two or more different bandwidth carriers, wherein at least one of the one or more identified parameters is a same parameter utilized for each of the two or more different bandwidth carriers.

24. The wireless communications system of claim 23, wherein the means for identifying the one or more parameters comprise at least one of:

means for reducing one or more cell search coherent accumulation lengths to facilitate the inter-frequency measurements with respect to the two or more different bandwidth carriers;

means for reducing one or more cell search non-coherent accumulation lengths to facilitate the inter-frequency measurements with respect to the two or more different bandwidth carriers;

means for increasing an amount of repetition of a transmission gap pattern to facilitate the inter-frequency measurements with respect to the two or more different bandwidth carriers;

means for increasing a length of a transmission gap to facilitate the inter-frequency measurements with respect to the two or more different bandwidth carriers; or means for reducing a window size to facilitate the inter-frequency measurements with respect to the two or more different bandwidth carriers.

25. The wireless communications system of claim 23, wherein the means for utilizing the one or more identified parameters comprise:

means for utilizing separate parameters of the one or more identified parameters to facilitate the inter-frequency measurements with respect to the two or more different bandwidth carriers.

26. The wireless communications system of claim 23, wherein the means for utilizing the one or more identified parameters comprise:

means for utilizing the same one or more parameters of the one or more identified parameters to facilitate the inter-frequency measurements with respect to the two or more different bandwidth carriers.

27. The wireless communications system of claim 23, wherein the means for identifying the one or more parameters comprise at least one of:

means for receiving the one or more parameters when the one or more parameters are transmitted from a base station; or means for determining the one or more parameters when the one or more parameters are stored on a storage medium of the wireless communications system.

28. A wireless communications device comprising:

at least one processor communicatively coupled with a memory, the memory comprising executable code that, when executed by the at least one processor, causes the at least one processor to:

identify one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and utilize the one or more identified parameters to perform one or more inter-frequency measurements with respect to the two or more different bandwidth carriers, wherein at least one of the one or more identified parameters is a same parameter utilized for each of the two or more different bandwidth carriers.

29. The wireless communications device of claim 28, wherein the executable code causes the at least one processor to perform at least one of:

reduce one or more cell search coherent accumulation lengths to facilitate the inter-frequency measurements with respect to the two or more different bandwidth carriers;

reduce one or more cell search non-coherent accumulation lengths to facilitate the inter-frequency measurements with respect to the two or more different bandwidth carriers;

increase an amount of repetition of a transmission gap pattern to facilitate the inter-frequency measurements with respect to the two or more different bandwidth carriers;

increase a length of a transmission gap to facilitate the inter-frequency measurements with respect to the two or more different bandwidth carriers; or reduce a window size to facilitate the inter-frequency measurements with respect to the two or more different bandwidth carriers.

30. The wireless communications device of claim 28, wherein the executable code causes the at least one processor to:

utilize separate parameters of the one or more identified parameters to facilitate the inter-frequency measurements with respect to the two or more different bandwidth carriers.

31. The wireless communications device of claim 28, wherein the executable code causes the at least one processor to:

utilize the same one or more parameters of the one or more identified parameters to facilitate the inter-frequency measurements with respect to the two or more different bandwidth carriers.

32. The wireless communications device of claim 28, wherein the executable code causes the at least one processor to perform at least one of:

receive the one or more parameters when the one or more parameters are transmitted from a base station; or determine the one or more parameters when the one or more parameters are stored on a storage medium of the wireless communications device.

33. A computer program product for inter-frequency measurements of flexible bandwidth carrier systems, comprising:

a non-transitory computer-readable medium comprising:

code configured to identify, at a user equipment, one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and code configured to utilize the one or more identified parameters to perform one or more inter-frequency measurements with respect to the two or more different bandwidth carriers, wherein at least one of the one or more identified parameters is a same parameter utilized for each of the two or more different bandwidth carriers.

34. The computer program product of claim 33, wherein the non-transitory computer-readable medium further comprises at least one of:

code configured to reduce one or more cell search coherent accumulation lengths to facilitate the inter-frequency measurements with respect to the two or more different bandwidth carriers;

code configured to reduce one or more cell search non-coherent accumulation lengths to facilitate the inter-frequency measurements with respect to the two or more different bandwidth carriers;

code configured to increase an amount of repetition of a transmission gap pattern to facilitate the inter-frequency measurements with respect to the two or more different bandwidth carriers;

code configured to increase a length of a transmission gap to facilitate the inter-frequency measurements with respect to the two or more different bandwidth carriers; or code configured to reduce a window size to facilitate the inter-frequency measurements with respect to the two or more different bandwidth carriers.

35. The computer program product of claim 33, wherein the non-transitory computer-readable medium further comprises:
code configured to utilize separate parameters of the one or more identified parameters to facilitate the inter-frequency measurements with respect to the two or more different bandwidth carriers.

36. The computer program product of claim 33, wherein the non-transitory computer-readable medium further comprises:
code configured to utilize the same one or more parameters of the one or more identified parameters to facilitate the inter-frequency measurements with respect to the two or more different bandwidth carriers.

37. The computer program product of claim 33, wherein the non-transitory computer-readable medium further comprises at least one of:
code configured to receive the one or more parameters when the one or more parameters are transmitted from a base station; or
code configured to determine the one or more parameters when the one or more parameters are stored on a storage medium of the user equipment.

38. A method for inter-frequency measurements of flexible bandwidth carrier systems, comprising:
identifying one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and
transmitting the one or more identified parameters to one or more user equipment to facilitate the inter-frequency measurements with respect to the two or more different bandwidth carriers, wherein at least one of the one or more identified parameters is a same parameter utilized for each of the two or more different bandwidth carriers.

39. The method of claim 38, wherein identifying the one or more parameters comprises:
reducing one or more cell search coherent accumulation lengths to facilitate the inter-frequency measurements with respect to the two or more different bandwidth carriers.

40. The method of claim 38, wherein identifying the one or more parameters comprises:
reducing one or more non-coherent accumulation lengths to facilitate the inter-frequency measurements with respect to the two or more different bandwidth carriers.

41. The method of claim 38, wherein identifying the one or more parameters comprises:
increasing an amount of repetition of a transmission gap pattern to facilitate the inter-frequency measurements with respect to the two or more different bandwidth carriers.

42. The method of claim 38, wherein identifying the one or more parameters comprises:
increasing a length of a transmission gap to facilitate the inter-frequency measurements with respect to the two or more different bandwidth carriers.

43. The method of claim 38, wherein identifying the one or more parameters comprises:
reducing a window size to facilitate the inter-frequency measurements with respect to the two or more different bandwidth carriers.

44. The method of claim 38, wherein the one or more identified parameters include at least one or more compressed mode parameters, timing information, or search parameters.

45. The method of claim 38, wherein at least one of the bandwidth carriers is a normal bandwidth carrier.

46. The method of claim 38, wherein separate parameters of the one or more identified parameters are configured to facilitate the inter-frequency measurements with respect to the two or more different bandwidth carriers.

47. The method of claim 38, wherein same parameters of the one or more identified parameters are configured to facilitate the inter-frequency measurements with respect to the two or more different bandwidth carriers.

48. The method of claim 38, wherein identifying the one or more parameters comprises:
determining the one or more parameters, wherein the one or more parameters are stored on a storage medium.

49. The method of claim 38, wherein same parameters of the one or more identified parameters are configured to facilitate the inter-frequency measurements with respect to a normal bandwidth carrier and with respect to the flexible bandwidth carrier.

50. A wireless communications system, comprising:
means for identifying one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and
means for transmitting the one or more identified parameters to one or more user equipment to facilitate the inter-frequency measurements with respect to the two or more different bandwidth carriers, wherein at least one of the one or more identified parameters is a same parameter utilized for each of the two or more different bandwidth carriers.

51. The wireless communications system of claim 50, wherein the means for identifying the one or more parameters comprise at least one of:
means for reducing one or more cell search coherent accumulation lengths to facilitate the inter-frequency measurements with respect to the two or more different bandwidth carriers;
means for reducing one or more cell search non-coherent accumulation lengths to facilitate the inter-frequency measurements with respect to the two or more different bandwidth carriers;
means for increasing an amount of repetition of a transmission gap pattern to facilitate the inter-frequency measurements with respect to the two or more different bandwidth carriers;

means for increasing a length of a transmission gap to facilitate the inter-frequency measurements with respect to the two or more different bandwidth carriers; or means for reducing a window size to facilitate the inter-frequency measurements with respect to the two or more different bandwidth carriers.

52. The wireless communications system of claim 50, wherein separate parameters of the one or more identified parameters are configured to facilitate the inter-frequency measurements with respect to the two or more different bandwidth carriers.

53. The wireless communications system of claim 50, wherein same parameters of the one or more identified parameters are configured to facilitate the inter-frequency measurements with respect to the two or more different bandwidth carriers.

54. A wireless communications device, comprising:
at least one processor communicatively coupled with a memory, the memory comprising executable code that, when executed by the at least one processor, causes the at least one processor to:
identify one or more parameters configured to facilitate inter-frequency measurements with respect to two or more different bandwidth carriers, wherein at least one of the bandwidth carriers is a flexible bandwidth carrier having a reduced bandwidth with respect to a normal bandwidth carrier; and
transmit the one or more identified parameters to one or more user equipment to facilitate the inter-frequency measurements with respect to the two or more different bandwidth carriers, wherein at least one of the one or more identified parameters is a same parameter utilized for each of the two or more different bandwidth carriers.

55. The wireless communications device of claim 54, wherein the executable code causes the at least one processor to perform at least one of:
reduce one or more cell search coherent accumulation lengths to facilitate the inter-frequency measurements with respect to the two or more different bandwidth carriers;
reduce one or more cell search non-coherent accumulation lengths to facilitate the inter-frequency measurements with respect to the two or more different bandwidth carriers;
increase an amount of repetition of a transmission gap pattern to facilitate the inter-frequency measurements with respect to the two or more different bandwidth carriers;
increase a length of a transmission gap to facilitate the inter-frequency measurements with respect to the two or more different bandwidth carriers; or
reduce a window size to facilitate the inter-frequency measurements with respect to the two or more different bandwidth carriers.

56. The wireless communications device of claim 54, wherein separate parameters of the one or more identified parameters are configured to facilitate the inter-frequency measurements with respect to the two or more different bandwidth carriers.

57. The wireless communications device of claim 54, wherein same parameters of the one or more identified parameters are configured to facilitate the inter-frequency measurements with respect to the two or more different bandwidth carriers.

58. A computer program product for inter-frequency measurements of flexible bandwidth carrier systems, comprising:
a non-transitory computer-readable medium comprising:
code configured to identify one or more parameters configured to facilitate the inter-frequency measurements with respect to two or more different bandwidth carriers, wherein at least one of the bandwidth carriers is a flexible bandwidth carrier having a reduced bandwidth with respect to a normal bandwidth carrier; and
code configured to transmit the one or more identified parameters to one or more user equipment to facilitate the inter-frequency measurements with respect to the two or more different bandwidth carriers, wherein at least one of the one or more identified parameters is a same parameter utilized for each of the two or more different bandwidth carriers.

59. The computer program product of claim 58, wherein the non-transitory computer-readable medium comprises at least one of:
code configured to reduce one or more cell search coherent accumulation lengths to facilitate the inter-frequency measurements with respect to the two or more different bandwidth carriers;
code configured to reduce one or more cell search non-coherent accumulation lengths to facilitate the inter-frequency measurements with respect to the two or more different bandwidth carriers;
code configured to increase an amount of repetition of a transmission gap pattern to facilitate the inter-frequency measurements with respect to the two or more different bandwidth carriers;
code configured to increase a length of a transmission gap to facilitate the inter-frequency measurements with respect to the two or more different bandwidth carriers; or
code configured to reduce a window size to facilitate the inter-frequency measurements with respect to the two or more different bandwidth carriers.

60. The computer program product of claim 58, wherein separate parameters of the one or more identified parameters are configured to facilitate the inter-frequency measurements with respect to the two or more different bandwidth carriers.

61. The computer program product of claim 58, wherein same parameters of the one or more identified parameters are configured to facilitate the inter-frequency measurements with respect to the two or more different bandwidth carriers.

* * * * *